United States Patent
Tanabe et al.

(10) Patent No.: US 8,532,422 B2
(45) Date of Patent: Sep. 10, 2013

(54) IMAGE RESTORING DEVICE AND IMAGE RESTORING METHOD

(75) Inventors: Nari Tanabe, Tokyo (JP); Toshihiro Furukawa, Tokyo (JP); Shunichi Kitahara, Tokyo (JP)

(73) Assignee: Tokyo University of Science Educational Foundation Administration Organization, Tokyo (JP)

( * ) Notice: Subject to any disclaimer, the term of this patent is extended or adjusted under 35 U.S.C. 154(b) by 472 days.

(21) Appl. No.: 13/057,059

(22) PCT Filed: Aug. 6, 2009

(86) PCT No.: PCT/JP2009/003780
§ 371 (c)(1),
(2), (4) Date: Feb. 1, 2011

(87) PCT Pub. No.: WO2010/016263
PCT Pub. Date: Feb. 11, 2010

(65) Prior Publication Data
US 2011/0135214 A1    Jun. 9, 2011

(30) Foreign Application Priority Data
Aug. 8, 2008  (JP) ................................ 2008-206316

(51) Int. Cl.
*G06K 9/00*       (2006.01)
(52) U.S. Cl.
USPC ........... 382/255; 382/254; 382/260; 382/270; 382/275
(58) Field of Classification Search
USPC .................. 382/254, 255, 260–266, 270–275
See application file for complete search history.

(56) References Cited

U.S. PATENT DOCUMENTS

| 6,628,842 B1 * | 9/2003 | Nagao ........................... 382/266 |
| 8,131,097 B2 * | 3/2012 | Lelescu et al. ................. 382/254 |

(Continued)

FOREIGN PATENT DOCUMENTS

| JP | 8-123959 A | 5/1996 |
| JP | 2003-60916 A | 2/2003 |

(Continued)

OTHER PUBLICATIONS

Jo, Takashi et al., "Image Modeling and Parameter Identification for Image Restoration Using a Kalman Filter", The transactions of the IEICE, 1997, pp. 2912-2919, vol. J80-D-II, No. 11.

(Continued)

*Primary Examiner* — Wesley Tucker
(74) *Attorney, Agent, or Firm* — Nath, Goldberg & Meyer; Jerald L. Meyer; Stanley N. Protigal

(57) ABSTRACT

A simple and practical image restoring device capable of improving the performance of image restoration. An image restoring device (100) is provided with a first restoration processing unit (160*a*) and estimates original image information from the degraded image information into which information unnecessary for the original image information is incorporated. A correlation calculating section (164) calculates the correlation value of the estimation error of when the state amount of a system at time n+1 including the original image information is estimated by information up to time n or the time n+1 with respect to the degraded image information of only the time n. A weighting factor calculating section (166) calculates a weighting factor to define the relationship of the optimum estimated value of the state amount at the time n+1 by the information up to the time n+1, the optimum estimated value of the state amount at the time n+1 by the information up to the time n, and an estimation error of an observed amount including the degraded image information by using the correlation value with respect to the degraded image information of only the time n. An optimum estimated value calculating section (168) calculates the optimum estimated value of the state amount at the time n+1 by the information up to the time n+1 by using the weighting factor with respect to the degraded image information of only the time n.

16 Claims, 27 Drawing Sheets

(56) References Cited

U.S. PATENT DOCUMENTS

| | | | | |
|---|---|---|---|---|
| 8,331,713 | B2* | 12/2012 | Shiraki et al. | 382/255 |
| 2008/0251719 | A1 | 10/2008 | Nakahira et al. | |
| 2010/0262425 | A1* | 10/2010 | Tanabe et al. | 704/233 |

FOREIGN PATENT DOCUMENTS

| | | |
|---|---|---|
| JP | 2007-241126 A | 9/2007 |
| JP | 2008-11252 A | 1/2008 |
| JP | 2008-177064 A | 7/2008 |

OTHER PUBLICATIONS

Matsumura, Atsushi et al., "A Kalman Filter Using Adaptive Image Modeling for Noise Reduction", The transactions of the IEICE, 2003, pp. 212-222, vol. J86-D-II, No. 2.

Tanabe, Nari et al., "Robust Noise Suppression Algorithm with the Kalman Filter Theory for White and Colored Disturbance", IEICE Transactions on Fundamentals of Electronics, Communications and Computer Sciences, 2008, pp. 818-829, vol. E91-A, No. 3.

Tanabe, Nari et al., "Robust noise suppression algorithm using the only Kalman filter theory for white and colored noises", IEICE Technical Report, 2008, pp. 51-56, vol. 107, No. 551.

Tanabe, Nari et al., "Robust noise suppression algorithm using Kalman filter theory with colored driving source", IEICE Technical Report, 2008, pp. 79-84, vol. 107, No. 532.

Hiramatsu, Tomoki et al., "A note on accurate restoration of in-vehicle camera images in foggy conditions: Application of fog deterioration model to Kalman filter", IEICE Technical Report, 2007, pp. 1-6, vol. 107, No. 104.

Kitahara, Shunichi, "Kalman Filter Based Restoration Algorithm for Degraded Images", IPSJ SIG Technical Reports, 2008, pp. 29-34, vol. 2008, No. 124.

Kitahara, Shunichi et al., "Kalman Filter Based Robust Restoration Method with Colored Driving Source", IEICE Technical Report, 2009, pp. 1-5, vol. 108, No. 491.

International Search Report for International Application No. PCT/JP2009/003780, mailed Sep. 15, 2009.

* cited by examiner

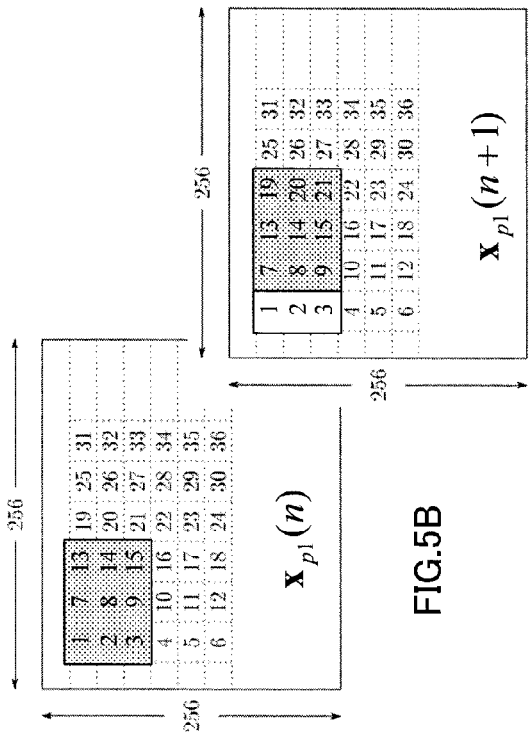

FIG.5A

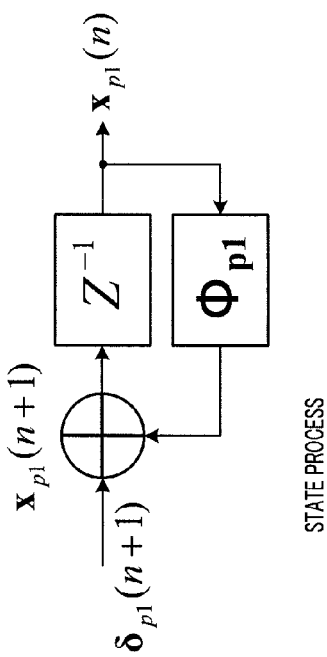

FIG.5B $$[\text{STATE EQUATION}]: \mathbf{x}_{p1}(n+1) = \mathbf{\Phi}_{p1}\mathbf{x}_{p1}(n) + \mathbf{\delta}_{p1}(n+1)$$

$$\begin{bmatrix} x_1(n+1) \\ x_2(n+1) \\ \vdots \\ x_9(n+1) \end{bmatrix} = \begin{bmatrix} 0 & \cdots & 0 & \cdots & 0 & | & 0 & 0 & 0 \\ 0 & \cdots & 0 & \cdots & 0 & | & 1 & 0 & 0 \\ \vdots & & \vdots & & \vdots & | & 0 & 1 & 0 \\ 0 & \cdots & 0 & \cdots & 0 & | & \ddots & 0 & 1 \\ \vdots & \ddots & \vdots & & \vdots & | & & & \\ 0 & \cdots & 1 & \cdots & 0 & | & & O & \\ \vdots & & \vdots & \ddots & \vdots & | & & & \\ 0 & \cdots & 0 & \cdots & 1 & | & & & \end{bmatrix} \begin{bmatrix} x_1(n) \\ x_2(n) \\ \vdots \\ x_9(n) \end{bmatrix} + \begin{bmatrix} 0 \\ \vdots \\ 0 \\ x_7(n+1) \\ x_8(n+1) \\ x_9(n+1) \end{bmatrix}$$

FIG.5C

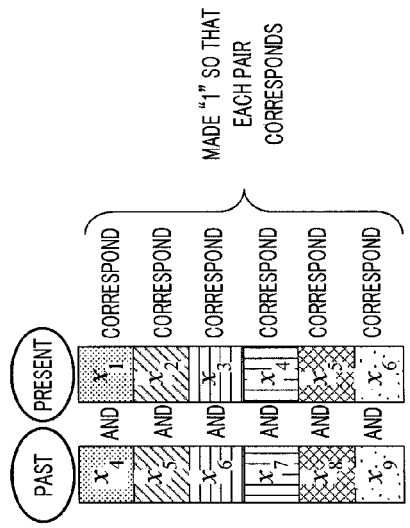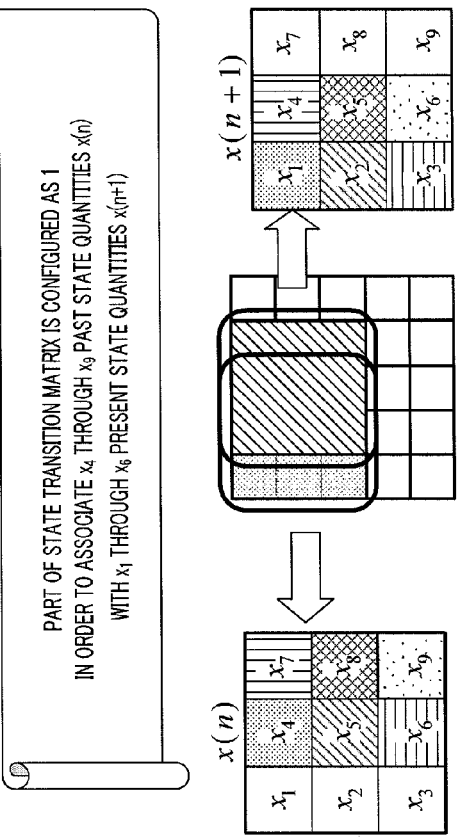
FIG.6

| $h_{-1,1}$ | $h_{0,1}$ | $h_{1,1}$ |
|---|---|---|
| $h_{-1,0}$ | $h_{0,0}$ | $h_{1,0}$ |
| $h_{-1,-1}$ | $h_{0,-1}$ | $h_{1,-1}$ |

[STATE EQUATION]
$$\mathbf{x}_{p1}(n+1) = \mathbf{\Phi}_{p1}\mathbf{x}_{p1}(n) + \mathbf{\delta}_{p1}(n+1)$$
[OBSERVATION EQUATION]
$$\mathbf{y}_{p1}(n) = \mathbf{M}_{p1}\mathbf{x}_{p1}(n) + \mathbf{\varepsilon}_{p1}(n)$$

[Initialization]

$$\hat{\mathbf{x}}_{p1}(0|0) = \mathbf{0}_K$$
$$\mathbf{P}_{p1}(0|0) = \mathbf{I}_K$$

$$\mathbf{R}_{\delta_{p1}}(n)[i,j] = \begin{cases} \dfrac{1}{K}\sum_{l=1}^{K}\left[\hat{\mathbf{x}}_{p1}^T(n-l)[1]\hat{\mathbf{x}}_{p1}(n-l)[1]\right] & (i=j,\ i,j > K^2 - K) \\ 0 & (i=j,\ i,j \leq K^2 - K) \\ 0 & (other) \end{cases}$$

$$\mathbf{R}_{\varepsilon_{p1}}[i,j] = E[\,\mathbf{\varepsilon}_{p1}(n)\mathbf{\varepsilon}_{p1}^T(n)][i,j] = \begin{cases} \sigma_\varepsilon^2 & i=j \\ 0 & i \neq j \end{cases}$$

[Iteration]
for n = 0

1. $\mathbf{P}_{p1}(n+1|n) = \mathbf{\Phi}_{p1}\mathbf{P}_{p1}(n|n)\mathbf{\Phi}_{p1}^T + \mathbf{R}_{\delta_{p1}}(n+1)$
2. $\mathbf{K}_{p1}(n+1) = \{\mathbf{P}_{p1}(n+1|n)\mathbf{M}_{p1}^T\}\{\mathbf{M}_{p1}\mathbf{P}_{p1}(n+1|n)\mathbf{M}_{p1}^T + \mathbf{R}_{\varepsilon_{p1}}(n+1)\}^{-1}$
3. $\hat{\mathbf{x}}_{p1}(n+1|n) = \mathbf{\Phi}_{p1}\hat{\mathbf{x}}_{p1}(n|n)$
4. $\hat{\mathbf{x}}_{p1}(n+1|n+1) = \hat{\mathbf{x}}_{p1}(n+1|n) + \mathbf{K}_{p1}(n+1)\{\mathbf{y}_{p1}(n+1) - \mathbf{M}_{p1}\hat{\mathbf{x}}_{p1}(n+1|n)\}$
5. $\mathbf{P}_{p1}(n+1|n+1) = \{\mathbf{I} - \mathbf{K}_{p1}(n+1)\mathbf{M}_{p1}\}\mathbf{P}_{p1}(n+1|n)$
6. $n = n+1 \quad\quad go\ back\ 1.$

FIG.12

[STATE EQUATION]:

$$\begin{bmatrix} x_1(n+1) \\ x_2(n+1) \\ \vdots \\ x_9(n+1) \end{bmatrix} = \begin{bmatrix} 0 & \cdots & 0 & 1 & 0 & \cdots & 0 \\ 0 & \cdots & & & 1 & \cdots & 0 \\ \vdots & & \ddots & & & \ddots & \vdots \\ 0 & \cdots & 0 & \cdots & & & 0 \\ & & & O & & & \end{bmatrix} \begin{bmatrix} x_1(n) \\ x_2(n) \\ \vdots \\ x_9(n) \end{bmatrix} + \begin{bmatrix} 0 \\ \vdots \\ 0 \\ x_7(n+1) \\ x_8(n+1) \\ x_9(n+1) \end{bmatrix}$$

[OBSERVATION EQUATION]:

$$\begin{bmatrix} y_1(n) \\ y_2(n) \\ \vdots \\ y_9(n) \end{bmatrix} = \begin{bmatrix} h_{0,0} & h_{0,1} & h_{-1,-1} & h_{-1,0} & h_{-1,1} & 0 & 0 & 0 \\ h_{0,-1} & \ddots & & & & \ddots & & 0 \\ h_{1,1} & & \ddots & & & & \ddots & 0 \\ h_{1,0} & & & \ddots & & & & h_{1,-1} \\ h_{1,-1} & & & & \ddots & & & \vdots \\ 0 & \ddots & & & & \ddots & & h_{-1,0} \\ 0 & & \ddots & & & & \ddots & h_{-1,1} \\ 0 & 0 & 0 & h_{0,0} & h_{0,1} & h_{1,-1} & h_{1,0} & h_{1,1} \end{bmatrix} \begin{bmatrix} x_1(n) \\ x_2(n) \\ \vdots \\ x_9(n) \end{bmatrix} + \begin{bmatrix} \varepsilon_1(n) \\ \varepsilon_2(n) \\ \vdots \\ \varepsilon_9(n) \end{bmatrix}$$

FIG.14

SIMULATION CONDITIONS
· ORIGINAL IMAGE : CAMERAMAN, LENNA
· PSF MODEL : TWO-DIMENSIONAL GAUSSIAN FUNCTION
· NOISE : ADDITIVE WHITE GAUSSIAN NOISE
· SNR(Signal to Noise Ratio) : 30dB
$$h(u,v) = \frac{1}{2\pi\sigma^2}\exp\left(-\frac{\left(u^2+v^2\right)}{2\sigma^2}\right), \quad \sigma^2 = 0.5$$
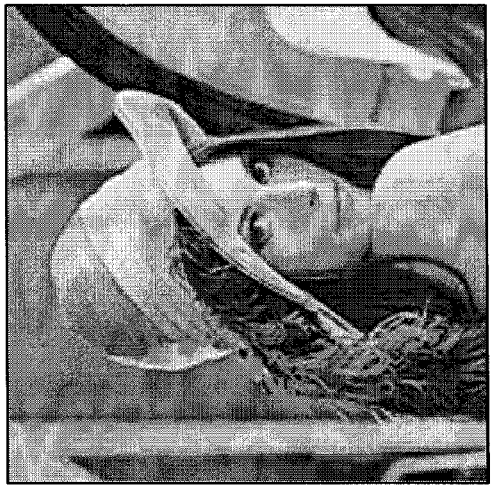
(a)
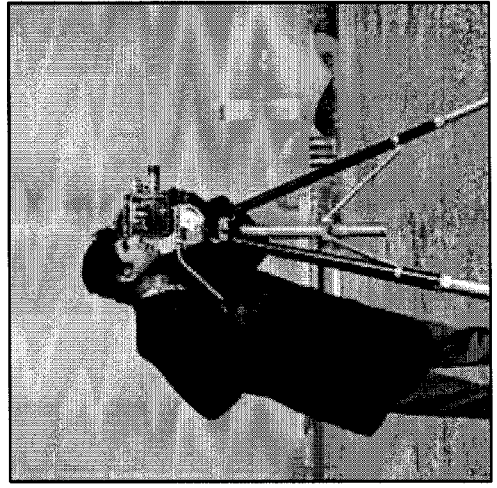
(b)
ORIGINAL IMAGES
FIG.15

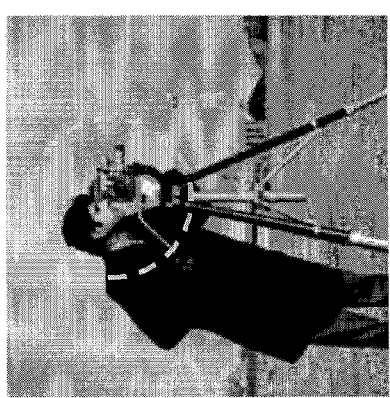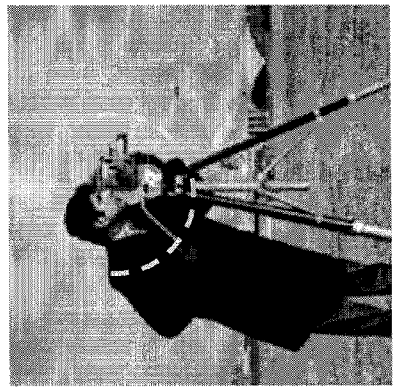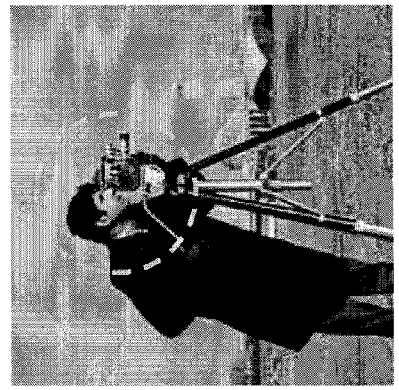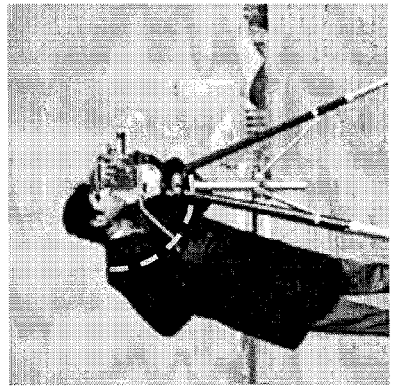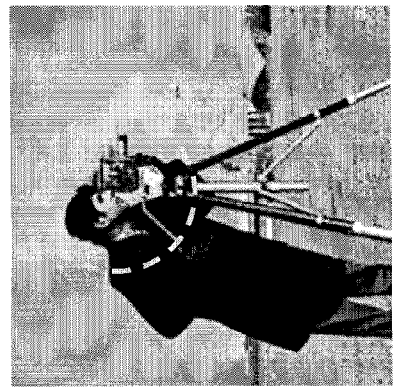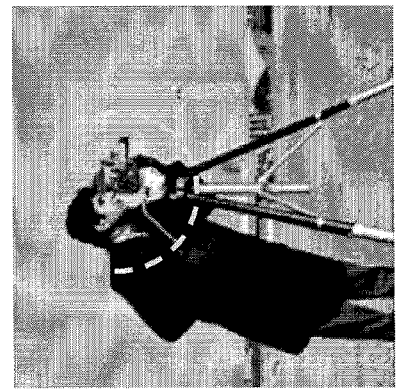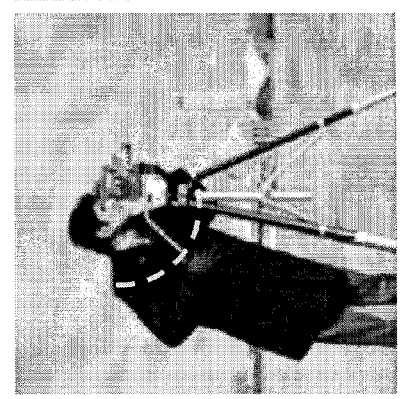
FIG.17

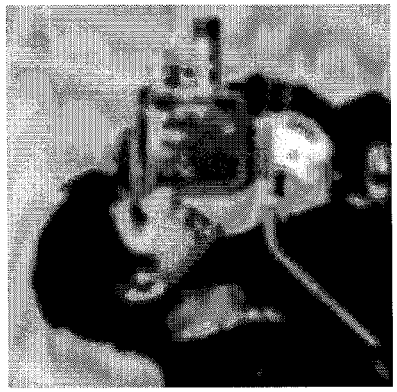
FIG.18

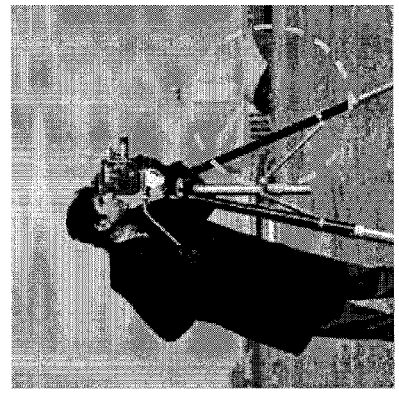
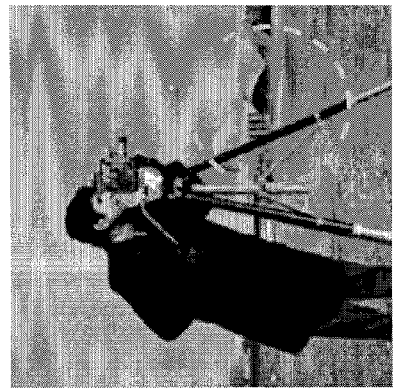
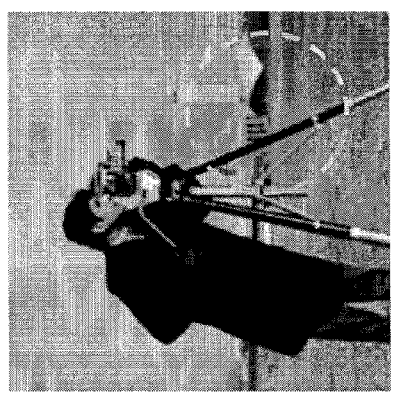
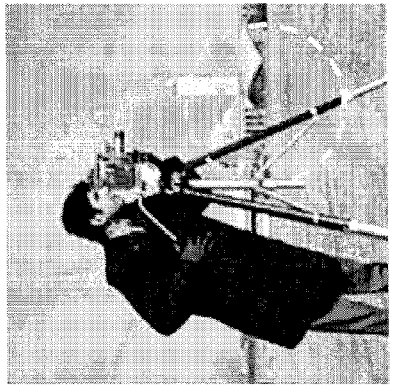
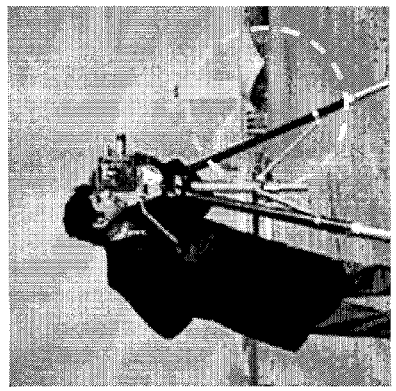
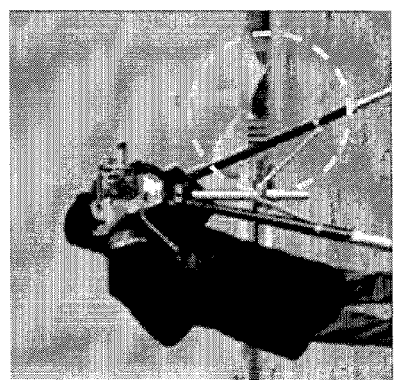
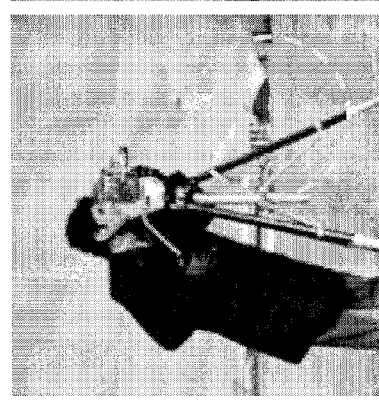
FIG.19

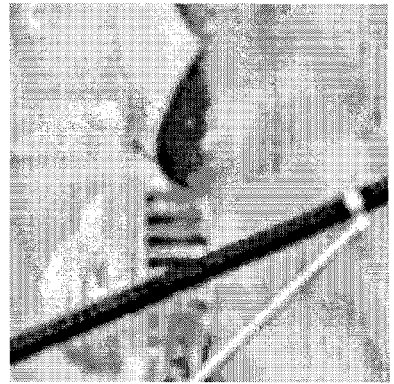
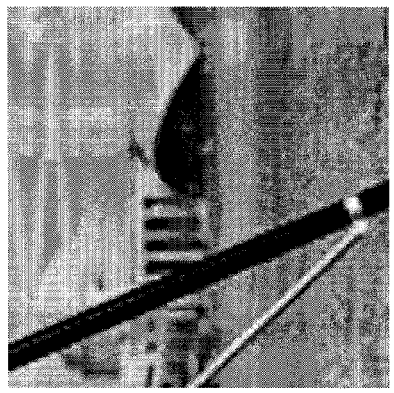
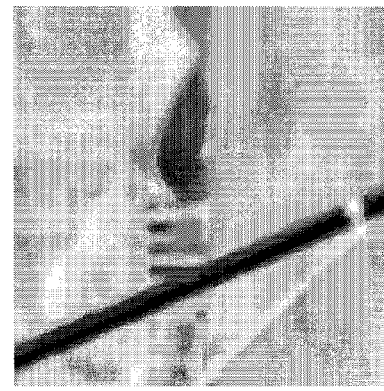
FIG.20

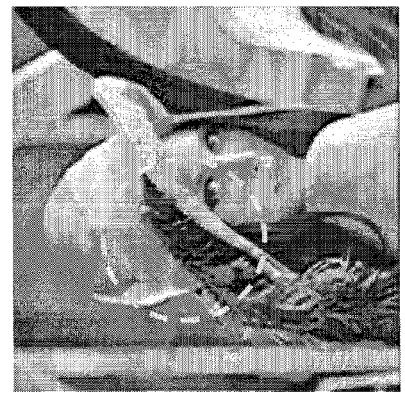
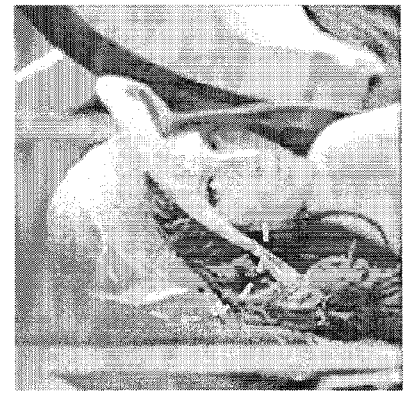
FIG.21

DEGRADED IMAGE
(ORIGINAL IMAGE + BLURRING + NOISE)
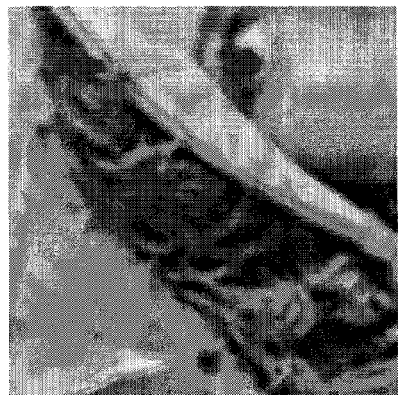
ORIGINAL IMAGE + BLURRING
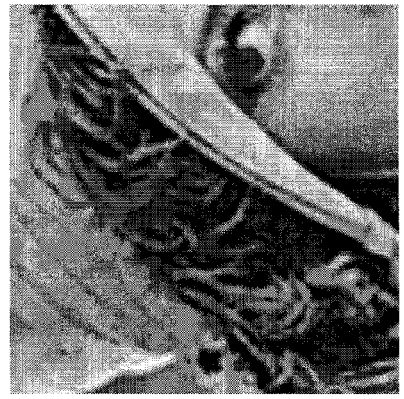
ORIGINAL IMAGE
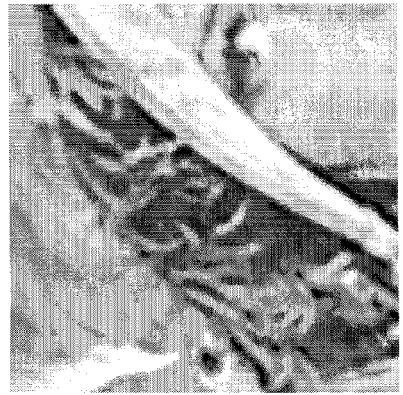
INVENTION METHOD
CONVENTIONAL METHOD 3
CONVENTIONAL METHOD 2
CONVENTIONAL METHOD 1
FIG.22

$SNR_{out}$ OF ORIGINAL IMAGES AND RESTORED IMAGES $$SNR_{out} = 20\log_{10} \frac{\sum_{x=1}^{256}\sum_{y=1}^{256}\{f(x,y)\}^2}{\sum_{x=1}^{256}\sum_{y=1}^{256}\{\hat{f}(x,y)-f(x,y)\}^2} \quad [dB]$$

EVALUATION BASED ON SIMULATION RESULTS
[dB]

|  | CONVENTIONAL METHOD 1 | CONVENTIONAL METHOD 2 | CONVENTIONAL METHOD 3 | INVENTION METHOD |
|---|---|---|---|---|
| Cameraman | 24.8 | 26.9 | 25.5 | 27.7 |
| Lenna | 25.8 | 27.8 | 27.4 | 30.0 |

FIG.23

IMAGE RESTORING DEVICE AND IMAGE RESTORING METHOD

This is a National Phase Application filed under 35 USC 371 of International Application No. PCT/JP2009/003780, filed on Aug. 6, 2009, an application claiming foreign priority benefits under 35 USC 119 of Japanese Application No. 2008-206316, filed on Aug. 8, 2008, the content of each of which is hereby incorporated by reference in its entirety.

TECHNICAL FIELD

The present invention relates to an image restoring apparatus and image restoring method.

BACKGROUND ART

In recent years, much research and development has been carried out in the field of image engineering into a technology for restoring an original image from a degraded image. That is to say, removing unnecessary information (blurring and noise) from a degraded image (received information) in which unnecessary information (blurring and noise) is mixed in with an original image (desired information, clear image), and extracting only the original image (desired information), is an essential technology in the field of image engineering, and has been the subject of much research and development in recent years. For example, an image captured by means of a digital camera (a generic term for a digital still camera and digital video camera), a mobile phone, or the like, inevitably shows image degradation in comparison with an original object due to the influence of "blurring" caused by camera shake, inaccurate focusing, or the like, and Gaussian or impulse "noise" caused by a dark current, thermal noise, or the like. "Image restoration" is the restoration of an image that is as close as possible to an original image from such a degraded image.

The majority of popular image restoration technologies currently on the market are preventive technologies that reduce the influence of blurring and noise in advance using, for example, camera shake correction, face recognition, color correction, various filters, and the like. As a result, in the field of digital cameras in particular, it has recently become possible to obtain vivid images easily through improved digital camera functionality and performance.

However, although there is no problem with such preventive technologies in circumstances in which images are recaptured numerous times, restoration for images that do not permit recapturing, as in the case of an already degraded image of an old document or the like, or images that change instantaneously in such fields as sport and medicine, remains a difficult problem. Here, images that change instantaneously in the fields of sport and medicine include, for example, an instantaneous action of a player, and instantaneous states of organs such as the heart and lungs. Therefore, image restoration in circumstances that do not permit recapturing has now become particularly important.

One widely known conventional image restoration technology for circumstances that do not permit recapturing is an image restoring method that uses a Wiener Filter (Non-Patent Literature 1, Non-Patent Literature 2). This method uses a filter that minimizes a mean squared error between a restored image obtained via a filter and an original image, and this filter is also called a least-squares filter. This method is an image restoring method in which processing is performed in the frequency domain, and therefore presupposes stationarity of a stochastic process and an image size of semi-infinite length.

Another known image restoration technology is an image restoring method that uses a projection filter (Non-Patent Literature 3, Non-Patent Literature 4). A projection filter evaluates closeness between an original image and a restored image, and minimizes a mean squared error of a restored image noise component among items for which an image component of noise of an original image has best approximation to individual original images—that is orthogonal projections of individual original images. From this property, a projection filter is a method of restoring a best-approximation image irrespective of frequency of appearance.

Yet another known image restoration technology is an image restoring method that uses a Kalman Filter (Non-Patent Literature 5, Non-Patent Literature 6). In this method, first, in step 1, an AR (Auto Regressive) system parameter (hereinafter referred to as "AR coefficient") is estimated, and then, in step 2, a state space model (comprising a state equation and observation equation) is configured using the AR coefficient estimated in step 1, and high-performance image restoration is implemented by applying this Kalman filter theory (Kalman filter algorithm).

CITATION LIST

Non-Patent Literature

NPL 1
NISHIMIYA Ryohei et al., (Image Restoration by Using Multiple Wiener Filters), Technical Report of IEICE, A, Vol. J83-A, No. 7, pp. 892-902, July 2000

NPL 2
YAMANE Nobumoto et al., (An Optimal Noise Removal Using Adaptive Wiener Filter Based on Locally Stationary Gaussian Mixture Distribution Model for Images), Technical Report of IEICE, A, Vol. J85-A, No. 9, pp. 993-1004, September, 2002

NPL 3
OGAWA Hidemitsu et al., (Properties of Partial Projection Filter), Technical Report of IEICE, A, Vol. J71-A, No. 2, pp. 527-534, February, 1988

NPL 4
KOIDE Yuji et al., (A Unified Theory of the Family of Projection Filters for Signal and Image Estimation), Technical Report of IEICE, D-II, Vol. J77-D-II, No. 7, pp. 1293-1301, July, 1994

NPL 5
TAKASHI Jo et al., (Image Modeling and Parameter Identification for Image Restoration Using a Kalman Filter), Technical Report of IEICE, D-II, Vol. J80-D-II, No. 11, pp. 2912-2919, November, 1997

NPL 6
MATSUMURA Atsushi et al., (A Kalman Filter Using Adaptive Image Modeling for Noise Reduction), Technical Report of IEICE, D-II, Vol. J86-D-II, No. 2, pp. 212-222, February, 2003

SUMMARY OF INVENTION

Technical Problem

However, an image restoring method that uses a Wiener filter, while offering the advantage of restoration being possible irrespective of the state of degradation of an image, also has a deficiency in that restoration precision is low for a natural image (an unprocessed image that is as captured) for which non-stationarity (variation of image variance) is high.

That is to say, as stated above, an image restoring method that uses a Wiener filter performs processing in the frequency domain, and therefore presupposes stationarity of a stochastic process and an image size of semi-infinite length, but in actuality, it is difficult to achieve this presupposition in a real environment, and therefore there are cases in which appropriate restoration is not performed (a natural image non-stationarity problem). Also, since this method comprises batch processing in which a minimum mean squared error is taken as an evaluation amount, there is a possibility of blurring remaining in a restored image (an evaluation amount problem).

Specifically, a problem with an image restoring method that uses a Wiener filter is that, if the frequency of appearance of an image is low, restoration precision decreases—that is, restoration of an edge part with a low frequency of appearance in an image is affected. In other words, there is a problem of not being able to perform optimum restoration of an edge part of an image captured with a camera because edge parts mostly have low non-stationarity. However, good restoration precision can normally be obtained for a monotone background part or the like in which gradation and color do not vary—that is, image variance does not vary—since stationarity is high in such a part.

An image restoring method that uses a Kalman filter is a method for solving the problems with an image restoring method that uses a Wiener filter (the natural image non-stationarity problem and evaluation amount problem), and while this method offers the advantage of enabling the problems with an image restoring method that uses a Wiener filter to be solved, there is a problem of restoration precision being low if there is degradation due to blurring in an image subject to processing (observed image, degraded image).

That is to say, with an image restoring method that uses a Kalman filter, in step 1, to consider the correlation between a pixel of interest and its surrounding pixels, and an AR coefficient is estimated for the pixel of interest and its surrounding pixels as preprocessing, and then, in step 2, a state space model (comprising a state equation and observation equation) is configured using the AR coefficient estimated in step 1—specifically, an image is restored using Kalman filter theory (a Kalman filter algorithm) by configuring a state equation from an AR coefficient estimated in step 1 and the original image, and configuring an observation equation from the original image, a degradation function, and noise. Therefore, an image restoring method that uses a Kalman filter is processing in the time domain only that does not presuppose stationarity, and is sequential processing that takes estimation error variance as an evaluation amount, and can therefore solve the problems of an image restoring method that uses a Wiener filter.

On the other hand, however, since a step 2 Kalman filter algorithm is executed using an AR coefficient estimated in step 1, there is a problem in that the restoration precision of a degraded image greatly depends on the precision of AR coefficient estimation in step 1 (an AR system problem). For example, in the case of a digital camera, if an image subject to processing includes degradation due to blurring (inaccurate focusing or the like), an AR order decision and AR coefficient estimation in step 1 become difficult, and therefore the precision of image restoration by means of a Kalman filter in step 2 is affected.

In this respect, accurate AR coefficient estimation is generally difficult. With image restoration, accurate AR coefficient estimation depends, for example, on a clear image (original image). This means that an original image must be known in advance, and therefore real-time processing is difficult. Also, even if it is possible to estimate an AR coefficient accurately in real time by some means or other, processing increases, and a problem of the amount of computation is unavoidable. Moreover, AR coefficient estimation is, in the first place, performed after an AR coefficient order has been decided, but deciding the order of an AR coefficient is extremely difficult, and it therefore follows that accurate AR coefficient estimation is difficult.

Therefore, there is now a demand for a simple and practical high-performance image restoring method that is capable of solving both the problems of an image restoring method that uses a Wiener filter and the problems of an image restoring method that uses a Kalman filter—that is, an image restoring method that has a simple configuration and can be used in a real environment, and furthermore provides high degraded image restoration performance (that is, image restoration capability).

It is an object of the present invention to provide a simple and practical image restoring apparatus and image restoring method capable of improving image restoration performance.

Solution to Problem

An image restoring apparatus of the present invention estimates original image information from only degraded image information in which unnecessary information is mixed in with the original image information, and employs a configuration having: a correlation computation section that calculates a correlation value of estimation error when a system state quantity at time n+1 that includes the original image information is estimated based on information until time n or time n+1 for degraded image information of only time n; a weighting factor calculation section that calculates a weighting factor for specifying a relationship of an optimum estimate of the state quantity at time n+1 based on information until time n+1, an optimum estimate of the state quantity at time n+1 based on information until time n, and estimation error of an observed quantity including the degraded image information, using a correlation value calculated by the correlation computation section, for degraded image information of only time n; and an optimum estimate calculation section that calculates an optimum estimate of the state quantity at time n+1 based on information until time n or time n+1, using a weighting factor calculated by the weighting factor calculation section, for degraded image information of only time n.

An image restoring apparatus of the present invention preferably estimates original image information from only degraded image information in which unnecessary information is mixed in with the original image information, and employs a configuration having: a first correlation computation section that calculates an estimation error correlation value matrix when a system state quantity at time n+1 that includes the original image information is estimated based on information until time n for degraded image information of only time n; a weighting factor calculation section that calculates a weighting factor matrix for specifying a relationship of an optimum estimate of the state quantity at time n+1 based on information until time n+1, an optimum estimate of the state quantity at time n+1 based on information until time n, and estimation error of an observed quantity including the degraded image information, using an estimation error correlation value matrix calculated by the first correlation computation section, for degraded image information of only time n; a first optimum estimate calculation section that calculates an optimum estimate vector of the state quantity at time n+1 based on information until time n for degraded image information of only time n; a second optimum estimate calculation section that calculates an optimum estimate vector of the state quantity at time n+1 based on information until time n+1, using a weighting factor matrix calculated by the weighting factor calculation section, for degraded image information of only time n; and a second correlation computation section that calculates an estimation error correlation value matrix when the state quantity at time n+1 is estimated based on information until time n+1 for degraded image information of only time n.

An image restoring method of the present invention estimates original image information from only degraded image information in which unnecessary information is mixed in with the original image information, and has: a correlation computation step of calculating a correlation value of estimation error when a system state quantity at time n+1 that includes the original image information is estimated based on information until time n or time n+1 for degraded image information of only time n; a weighting factor calculation step of calculating a weighting factor for specifying a relationship of an optimum estimate of the state quantity at time n+1 based on information until time n+1, an optimum estimate of the state quantity at time n+1 based on information until time n, and estimation error of an observed quantity including the degraded image information, using a correlation value calculated by the correlation computation step, for degraded image information of only time n; and an optimum estimate calculation step of calculating an optimum estimate of the state quantity at time n+1 based on information until time n or time n+1, using a weighting factor calculated by the weighting factor calculation step, for degraded image information of only time n.

An image restoring method of the present invention preferably estimates original image information from only degraded image information in which unnecessary information is mixed in with the original image information, and has: a first correlation computation step of calculating an estimation error correlation value matrix when a system state quantity at time n+1 that includes the original image information is estimated based on information until time n for degraded image information of only time n; a weighting factor calculation step of calculating a weighting factor matrix for specifying a relationship of an optimum estimate of the state quantity at time n+1 based on information until time n+1, an optimum estimate of the state quantity at time n+1 based on information until time n, and estimation error of an observed quantity including the degraded image information, using an estimation error correlation value matrix calculated by the first correlation computation step, for degraded image information of only time n; a first optimum estimate calculation step of calculating an optimum estimate vector of the state quantity at time n+1 based on information until time n for degraded image information of only time n; a second optimum estimate calculation step of calculating an optimum estimate vector of the state quantity at time n+1 based on information until time n+1, using a weighting factor matrix calculated by the weighting factor calculation step, for degraded image information of only time n; and a second correlation computation step of calculating an estimation error correlation value matrix when the state quantity at time n+1 is estimated based on information until time n+1 for degraded image information of only time n.

Advantageous Effects of Invention

The present invention enables a simple and practical image restoring apparatus and image restoring method to be obtained that are capable of improving image restoration performance.

BRIEF DESCRIPTION OF DRAWINGS

FIG. 5 is a drawing for explaining an actual example of formulation of a state equation of an invention method, wherein more particularly, FIG. 5A is a drawing showing a state process of a state space model, FIG. 5B is a drawing showing an example of a processing-object block and time variation thereof, and FIG. 5C is a drawing showing an actual example of a state equation;

FIG. 6 is a drawing for explaining a configuration of a state equation of an invention method;

FIG. 7 is a drawing for explaining an actual example of formulation of an observation equation of an invention method, wherein more particularly.

FIG. 8 is a drawing for explaining a configuration (general example) of a conventional general observation equation, wherein more particularly.

FIG. 9 is a drawing for explaining a configuration of an observation equation of an invention method, wherein more particularly.

FIG. 10 is a drawing for explaining an assignment method of factors that configure an observation transition matrix;

FIG. 11 is a drawing showing a range of state quantities that influence observation quantities, based on the observation transition matrix shown in FIG. 9A, together with assigned factors;

FIG. 12 is a drawing showing an example of an algorithm of an invention method;

FIG. 14 is an explanatory drawing that visually summarizes an invention method;

FIG. 15 is a drawing for explaining simulation conditions;

FIG. 17 is a drawing showing simulation results (visual evaluation) for original image "Cameraman";

FIG. 18 is a drawing in which the area circled with a dotted line in FIG. 17 has been enlarged;

FIG. 19 is a drawing showing simulation results (visual evaluation) for original image "Cameraman";

FIG. 20 is a drawing in which the area circled with a dotted line in FIG. 19 has been enlarged;

FIG. 21 is a drawing showing simulation results (visual evaluation) for original image "Lenna";

FIG. 22 is a drawing in which the area circled with a dotted line in FIG. 21 has been enlarged;

FIG. 23 is a drawing showing simulation results (objective evaluation) for original images;

DESCRIPTION OF EMBODIMENTS

Now, an embodiment of the present invention will be described in detail with reference to the accompanying drawings.

Figure 1:
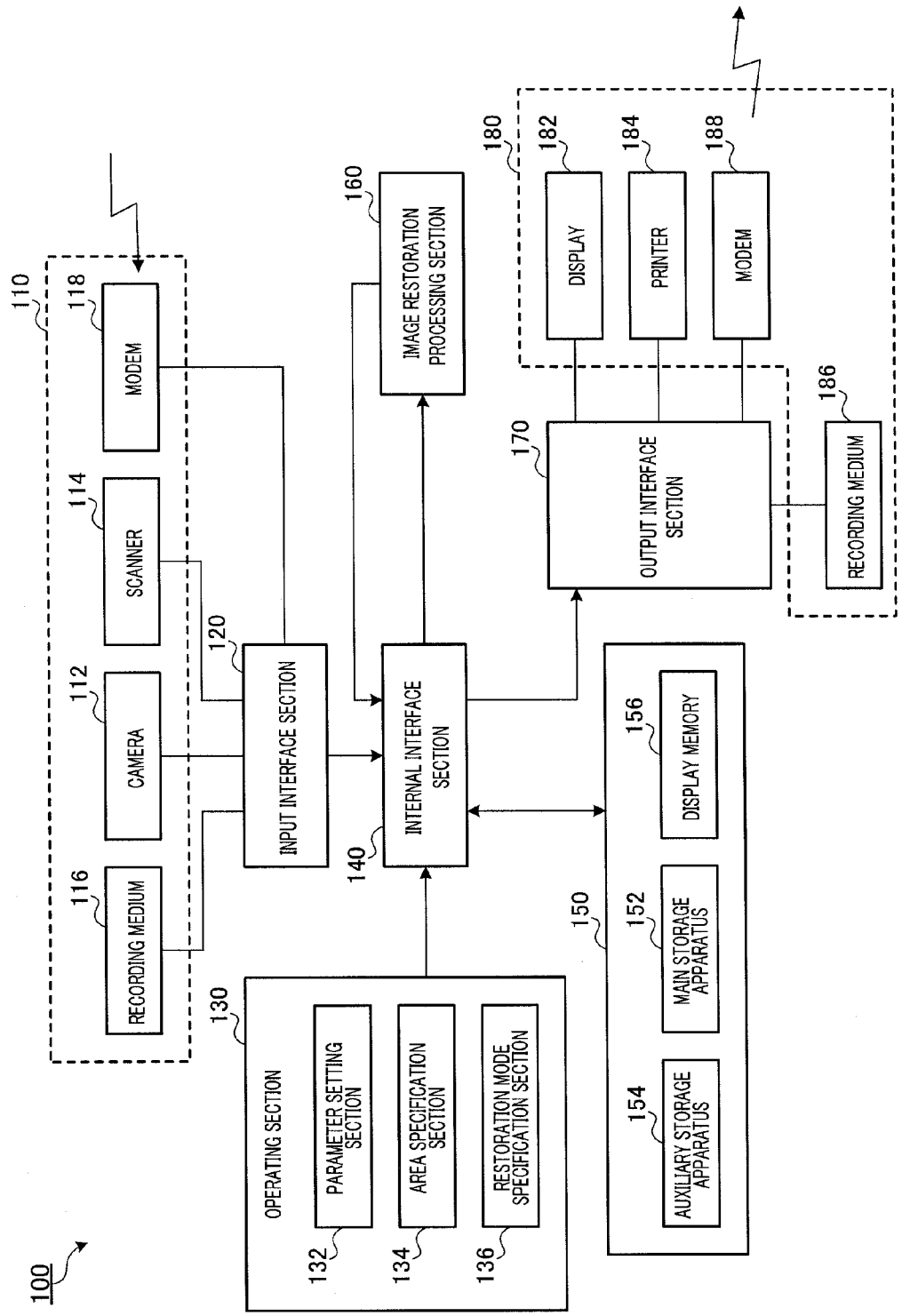
FIG. 1 is a block diagram showing the configuration of an image restoring apparatus according to an embodiment of the present invention.

FIG. 1 is a block diagram showing the configuration of an image restoring apparatus according to an embodiment of the present invention. Here, a preferred image restoring apparatus to which an image restoring method of the present invention is applied will be described taking a general-purpose image restoring apparatus suitable for a variety of uses as a particular example.

Image restoring apparatus 100 shown in FIG. 1 is configured by means of a computer, and broadly comprises image input apparatus 110, input interface section 120, operating section 130, internal interface section 140, storage section 150, image restoration processing section 160, output interface section 170, and image output apparatus 180.

Image input apparatus 110 is an input apparatus for inputting image data (a degraded image) that is a restoration processing object to a camera as digital data. An input image may be a still image or a moving image. Camera 112, scanner 114, recording medium 116, modem 118, or the like, can be used as image input apparatus 110. Camera 112 means any apparatus that has a photographic function, and, in addition to a digital camera (digital still camera or digital video camera), can include a mobile phone with a built-in camera function, a crime-prevention camera (surveillance camera), or a medical device for performing diagnostic imaging (such as an endoscope, X-ray machine, CT scanner, or MRI scanner), for example. Scanner 114 is a representative image input apparatus, and includes a film scanner that performs dedicated reading from a negative or positive file, or the like. Recording medium 116 refers to recording media capable of recording image data in general, and includes, for example, a magnetic disk (HDD, FD, or the like), an optical disk (CD, DVD, BD, or the like), magneto-optical disk (MO), flash memory (such as a memory card or USB memory), and so forth. Modem 118 is an apparatus for connecting to an external communication network (such as a telephone line or LAN, or the Internet, for example). The type of image input apparatus 110 can be selected as appropriate according to the use of image restoring apparatus 100.

Input interface section 120 performs input processing such as converting image data provided from image input apparatus 110 to a data format that can be processed by a computer. Although not shown in the drawing, input interface section 120 is provided separately and independently according to the type of image input apparatus 110. For example, input interface section 120 of recording medium 116 is called a drive, and various kinds of drive can be used according to the type of recording medium 116. A drive is an apparatus that reads a recording medium, and for a recording medium only, input interface section 120 and output interface section 170 are normally integrated. Also, since modem 118 can function both as image input apparatus 110 and image output apparatus 180, modem 118 is also normally integrated with input interface section 120 and output interface section 170. Input interface section 120 may be an internal card (board) accommodated inside the computer body, or may be an external device connected via internal interface section 140.

If image input apparatus 110 outputs image information as analog data, corresponding input interface section 120 has a sampling section and A/D conversion section (neither of which is shown). The sampling section performs sampling processing of an input analog signal at a predetermined sampling frequency, and outputs the result to the A/D conversion section. The sampling frequency can be changed according to the type of restoration processing object (information source). The A/D conversion section performs A/D conversion processing of an amplitude value of a sampled signal at a predetermined resolution.

Operating section 130 is typically a keyboard, mouse, touch panel, or the like, but a speech recognition apparatus may also be used. A user can use operating section 130 and operate the computer while confirming the operation on display 182 described later herein, for example. Operating section 130 has parameter setting section 132, area specification section 134, and restoration mode specification section 136, described later herein. Parameter setting section 132 sets the values of various parameters necessary for image restoration processing according to this embodiment, described in detail later herein, by means of a user input operation. Area specification section 134 specifies an area (a specific range of an image) that is to be an object of image restoration processing for an input image by means of a user input operation. Restoration mode specification section 136 specifies a restoration mode described later herein by means of a user input operation.

Internal interface section 140 is inside the computer body, and has a function of mutually connecting input interface section 120, operating section 130, storage section 150, image restoration processing section 160, and output interface section 170. The exchange of various signals inside the computer is performed via internal interface section 140.

Storage section 150 has main storage apparatus 152 and auxiliary storage apparatus 154. Main storage apparatus 152 is one component element of the computer body, and mainly stores programs and data. Auxiliary storage apparatus 154 is a storage apparatus that supplements insufficient main storage apparatus 152 capacity. Auxiliary storage apparatus 154 is typically a hard disk (HD), but may also be volatile storage such as a CD-ROM, DVD, SSD (Solid State Drive), flash memory, or the like, or a combination of these. A program (image restoration algorithm) that executes image restoration processing in this embodiment may be stored in storage section 150 (main storage apparatus 152 or auxiliary storage apparatus 154) beforehand, or may be installed in storage section 150 from recording medium 116 via both interface sections 120 and 140, or downloaded to storage section 150 from outside via modem 118 and both interface sections 120 and 140.

In order to execute a series of processing operations comprising fetching image data from image input apparatus 110, performing image restoration processing on fetched image data, and fetching image data that has undergone restoration processing from image output apparatus 180, a storage area required temporarily during data processing (also called a work area or work memory) and a storage area that stores image data to be output are necessary. These storage areas can be located in main storage apparatus 152 or auxiliary storage apparatus 154, but here, for convenience of explanation, a case in which image data that has undergone restoration processing is output to display 182 described later herein is assumed, and display memory 156 is shown separately in the drawing.

Image restoration processing section 160 is a characteristic configuration element of the present invention that executes a built-in image restoration algorithm described later herein. With a conventional image restoring method that uses a Kalman filter, image restoration is implemented by means of two-step processing—that is, first deciding an AR order and estimating an AR coefficient, and then configuring a state space model (comprising a state equation and observation equation) using this estimated AR coefficient and executing Kalman filtering—whereas with an image restoring method of the present invention (hereinafter referred to as "invention method"), image restoration is implemented by means of a new prediction method comprising a state equation and an observation equation. Specifically, with the invention method, image restoration is implemented by configuring a new state space model (comprising a state equation and observation equation) that does not require the concept of an AR system, and, more specifically, by using a new state space model in which a state equation is configured using only clear image information (original image information), and an observation equation is configured using degraded image information, clear image information (original image information), blurring information, and noise. An image that is to be an object of image restoration may be a still image or a moving image. Details of an image restoring method of the present invention will be given later herein.

Image output apparatus 180 is an output apparatus for outputting image data that has undergone restoration processing by the computer (image restoration processing section 160) (a restored image) in a predetermined output form. For example, display 182, printer 184, recording medium 186, modem 188, or the like, can be used as image output apparatus 180. Recording medium 186 and modem 188 may also be shared as image input apparatus 110 recording medium 116 and modem 118. The type of image input apparatus 110 can be selected as appropriate according to the use of image restoring apparatus 100.

Output interface section 170 performs output processing such as converting data that has undergone restoration processing by the computer (image restoration processing section 160) to a data format that can be output to image output apparatus 180. Although not shown in the drawing, output interface section 170 is provided separately and independently according to the type of image output apparatus 180. As described above, a recording medium and modem are normally integrated with input interface section 120 and output interface section 170. Like input interface section 120, output interface section 170 may be an internal card (board) accommodated inside the computer body, or may be an external device connected via internal interface section 140.

Figure 2A:
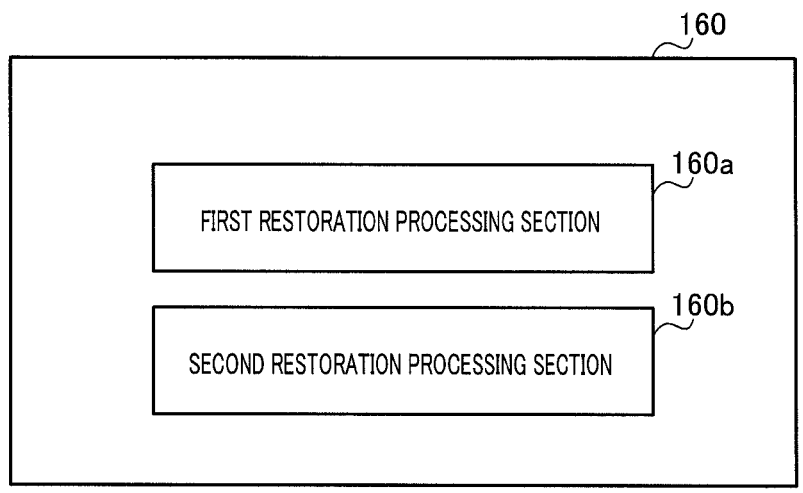
FIG. 2A is a block diagram showing the configuration of the image restoration processing section in FIG. 1.
Figure 2B:
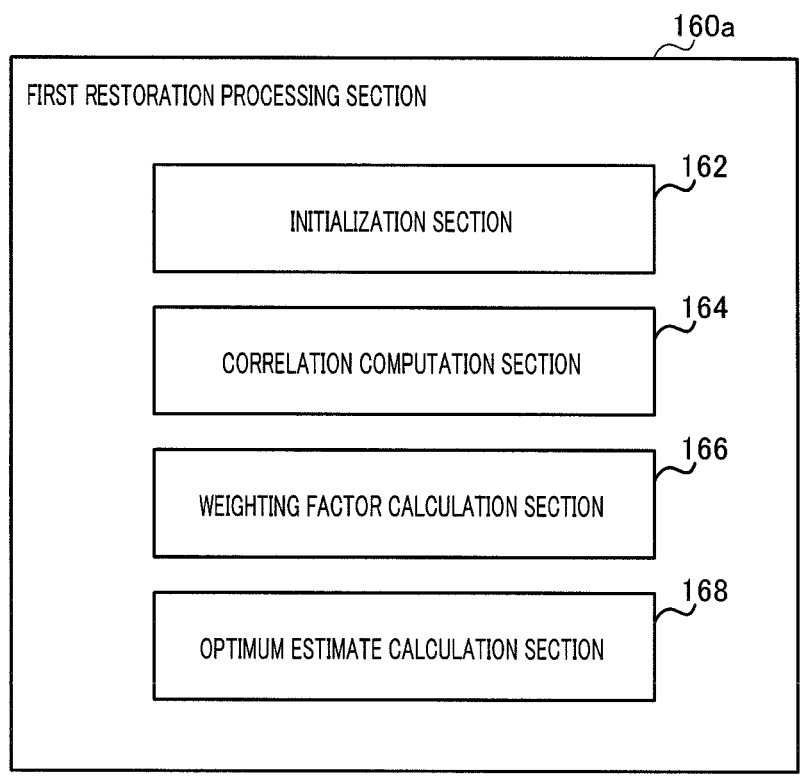
FIG. 2B is a block diagram showing the configuration of the first restoration processing section in FIG. 2A.

FIG. 2A is a block diagram showing the configuration of image restoration processing section 160 in FIG. 1, and FIG. 2B is a block diagram showing the configuration of first restoration processing section 160a in FIG. 2A.

As shown in FIG. 2A, in this embodiment image restoration processing section 160 has first restoration processing section 160a and second restoration processing section 160b. First restoration processing section 160a implements an image restoring method of the present invention. Second restoration processing section 160b implements an image restoring method other than an image restoring method of the present invention—for example, a conventional image restoring method such as an image restoring method that uses a Wiener filter or an image restoring method that uses a Kalman filter. By this means, image restoration processing that uses first restoration processing section 160a and second restoration processing section 160b is possible. Below, an image restoring method that uses a Wiener filter (hereinafter referred to as "conventional method") is taken as an example of a conventional image restoring method implemented by second restoration processing section 160b.

As shown in FIG. 2B, first restoration processing section 160a has initialization section 162, correlation computation section 164, weighting factor calculation section 166, and optimum estimate calculation section 168. First restoration processing section 160a restores a clear image (original image) from only captured data (a degraded image) by executing a built-in image restoration algorithm (invention method) through the collaboration of sections 162 through 168. At this time, initialization section 162 performs initialization of the image restoration algorithm of the invention method, correlation computation section 164 performs estimation error correlation computation for an original image (desired information, clear image), weighting factor calculation section 166 performs calculation of a weighting factor necessary for calculation of an original image (desired information) optimum estimate, and optimum estimate calculation section 168 performs calculation of an original image (desired information) optimum estimate. The details of processing in sections 162 to 168 will be described later.

Below, image restoration processing operations performed by first restoration processing section 160a will be described in detail, but first, a degraded image model constituting an image restoration theory will be described.

A degraded image is generally obtained by means of a model in which noise is added to a convolution of an original image and a blurring Point Spread Function (PSF). That is to say, if an object is represented by f(n,m), a blurring point spread function by h(x,y), and noise by n(x,y), then degraded image g(x,y) obtained by means of an imaging system (an apparatus that photographs an object, a system that generates an image, and so forth) is represented by equation 1 below. Blurring point spread function h(x,y) represents imaging system characteristics including imaging conditions and the like.

(Equation 1)

$$g(x, y) = \int_{-\infty}^{\infty} \int_{-\infty}^{\infty} h(x - n, y - m) f(n, m) dn\, dm + n(x, y) \qquad [1]$$

Figure 3:
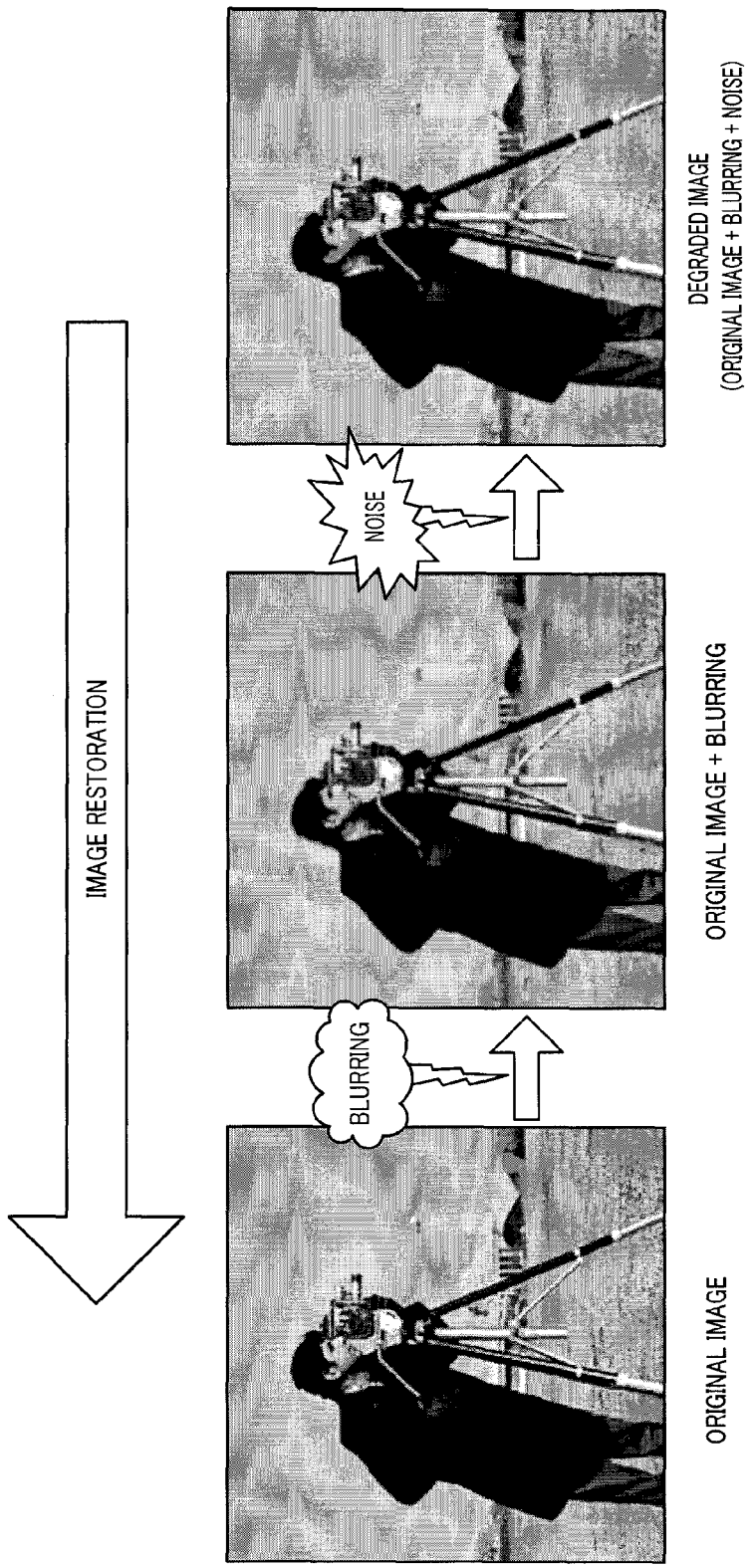
FIG. 3 is a drawing for explaining an image degradation process.

FIG. 3 is a drawing for explaining an image degradation process.

For example, when blurring occurs in the original image shown on the left side of FIG. 3, the image shown in the center of FIG. 3 results, and when noise is added to this image, the degraded image shown on the right side of FIG. 3 results. Blurring is caused by a certain pixel affecting surrounding pixels, but noise occurs without relation to pixels. As explained above, when an image is captured with a camera or the like, blurring occurs due to camera shake, inaccurate focusing, or the like, while noise occurs unavoidably due to a dark current, thermal noise, or the like. As shown in FIG. 3, the original image of a degraded image is simply the degraded image with blurring and noise removed.

As explained above, in the invention method, a new state space model (comprising a state equation and observation equation) is configured so as not to use the concept of an AR system. That is to say, a state equation is configured using only clear image information (original image information), and an observation equation is configured using degraded image information, clear image information (original image information), blurring information, and noise.

Specifically, in the invention method, a new state space model (comprising a state equation and observation equation) is configured, and this new state space model is represented by equations 2 below. In a state equation, vector $x_{p1}(n)$ is a state vector (original image information), matrix $\Phi_{p1}$ is a state transition matrix, and vector $\delta_{p1}(n)$ is a drive source. In an observation equation, vector $y_{p1}(n)$ is an observation vector (observed image information, degraded image information), matrix $M_{p1}$ is an observation transition matrix, and vector $\epsilon_{p1}(n)$ is observed noise. Also, "n" is apparatus time n. Time n represents an order ("nth") of processing of a processing-object block comprising a plurality of surrounding pixels including a pixel of interest. Here, one actual method (hereinafter referred to as "invention method 1") is presented as an invention method. In the following description, subscript "p1" indicates an item relating to invention method 1.

[2]

[STATE EQUATION]: $x_{p1}(n+1) = \Phi_{p1} x_{p1}(n) + \delta_{p1}(n+1)$

[OBSERVATION EQUATION]: $y_{p1}(n) = M_{p1} x_{p1}(n) + \epsilon_{p1}(n)$ (Equations 2)

Figure 4:
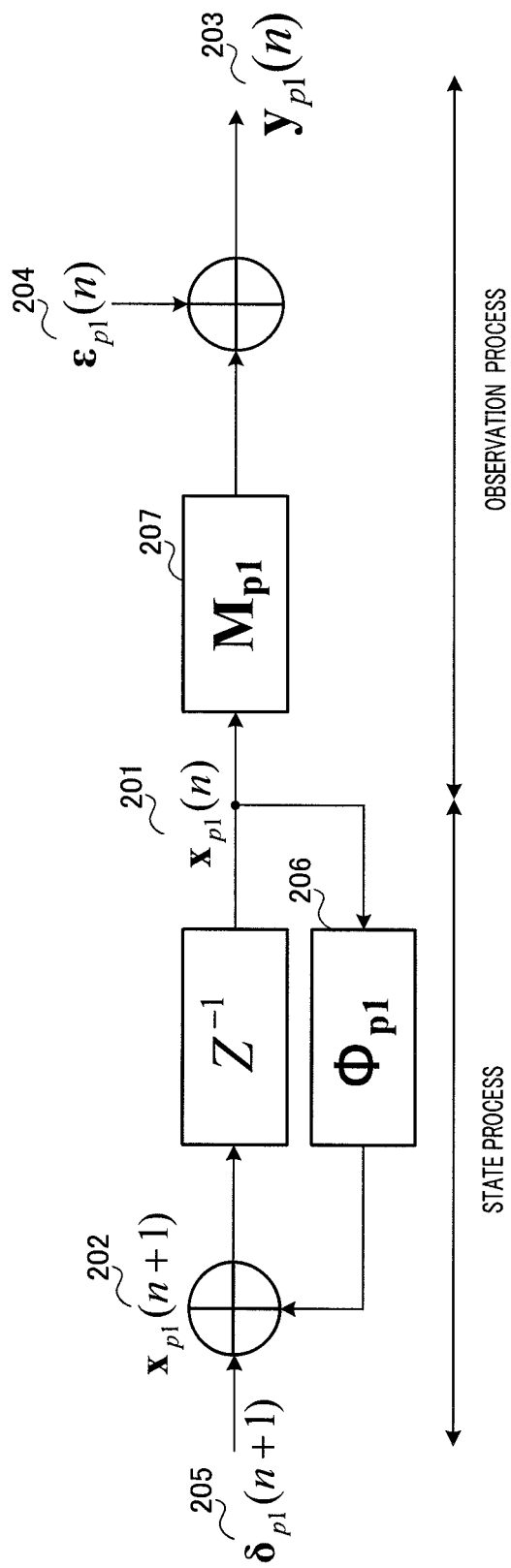
FIG. 4 is a block diagram representing a system configuration of a state space model of an invention method.

FIG. 4 represents a system configuration according to this state space model by means of a block diagram.

As shown in FIG. 4, this state space model is configured by means of a state process and an observation process. The state process is described by means of a state equation, and the observation process is described by means of an observation equation. In FIG. 4, "201" is state vector $x_{p1}(n)$ at time n, "202" is state vector $x_{p1}(n+1)$ at time n+1, "203" is observation vector $y_{p1}(n)$ at time n, "204" is observed noise vector $\epsilon_{p1}(n)$ at time n, "205" is drive source vector $\delta_{p1}(n+1)$ at time n+1, "206" is state transition matrix $\Phi_{p1}$, and "207" is observation transition vector $M_{p1}$. A state equation in equations 2 describes an observation object system as a state space model, and represents a generation process for a time of an internal state—that is, state variables (here, state vectors $x_{p1}(n)$ and $x_{p1}(n+1)$). Also, the observation equation in equations 2 describes a process observed via an observation apparatus of some kind, and shows how an observation result (here, observation vector $y_{p1}(n)$) is generated depending on an observed quantity—that is, input (here, state vector $x_{p1}(n)$).

FIG. 5 is a drawing for explaining an actual example of formulation of a state equation of the invention method, wherein more particularly, FIG. 5A is a drawing showing a state process of a state space model, FIG. 5B is a drawing showing an example of a processing-object block and time variation thereof, and FIG. 5C is a drawing showing an actual example of a state equation.

In this embodiment, in degraded image restoration processing, processing is performed that does not use only a processing-object pixel, but also includes surrounding pixels. That is to say, a surrounding K×K (where J>K) area (hereinafter referred to as "area of interest") centered on a certain processing-object pixel of a J×J-size image is taken as a processing-object block, and image restoration processing is performed using pixel information of the center of this processing-object block. Thus, "area of interest" means a range in which processing is performed using K×K pixels in image restoration.

For example, as shown in FIG. 5, if J=256 and K=3, a surrounding 3×3 area of interest centered on a certain processing-object pixel of a 256×256-size image becomes a processing-object block. In the drawing, a processing-object block is shaded. Image restoration processing is performed using pixel information of the center of this 3×3 area of interest. If, simply for convenience of explanation, numbers 1 to 36 are assigned to some pixels of a 256×256-size image as shown in FIG. 5B, a processing-object block corresponding to state vector $x_{p1}(n)$ at time n has 3×3=9 pixels numbered 1, 2, 3, 7, 8, 9, 13, 14, 15 as component pixels, and a processing-object block corresponding to state vector $x_{p1}(n+1)$ at next time n+1 has 3×3=9 pixels numbered 7, 8, 9, 13, 14, 15, 19, 20, 21 as component pixels.

At this time, a state equation in equations 2 is defined by equation 3 below, which is also shown in FIG. 5C. Here, state vector $x_{p1}(n)$ is a 9×1 vector with nine items of pixel information $x_1(n)$, $x_2(n)$, $x_3(n)$, $x_4(n)$, $x_5(n)$, $x_6(n)$, $x_7(n)$, $x_8(n)$, $x_9(n)$ included in a 3×3 processing-object block as a state quantity including original image information as elements. Also, state transition matrix $\Phi_{p1}$ is a 9×9 matrix defined by equation 3, and drive source vector $\delta_{p1}(n)$ is a 9×1 vector also defined by equation 3.

(Equation 3)

$$x_{p1}(n+1) = \Phi_{p1} x_{p1}(n) + \delta_{p1}(n+1) \quad [3]$$

$$\begin{bmatrix} x_1(n+1) \\ x_2(n+1) \\ \vdots \\ x_9(n+1) \end{bmatrix} = \begin{bmatrix} 0 & 0 & 0 & 1 & 0 & \cdots & 0 \\ \vdots & & & & \ddots & & \vdots \\ 0 & \cdots & & 0 & 1 & 0 & \cdots & 0 \\ \vdots & & & & & \ddots & & \vdots \\ 0 & & & \cdots & \cdots & & 0 & 1 \\ \hline & & & & O & & & \end{bmatrix} \begin{bmatrix} x_1(n) \\ x_2(n) \\ \vdots \\ x_9(n) \end{bmatrix} + \begin{bmatrix} 0 \\ \vdots \\ 0 \\ x_7(n+1) \\ x_8(n+1) \\ x_9(n+1) \end{bmatrix}$$

FIG. 6 is a drawing for explaining the configuration of the state equation represented by equation 3.

Characteristics of the state equation represented by equation 3 are that some pixels of state transition matrix $\Phi_{p1}$ are set to "1" and the remaining pixels are all set to "0", and that some pixels of drive source vector $\delta_{p1}(n)$ are represented by state quantity $x_i(n)$ (i=7, 8, 9) that is a colored signal. This is in order to mutually associate present state quantities (original image pixel information) $x_1(n+1)$, $x_2(n+1)$, $x_3(n+1)$, $x_4(n+1)$, $x_5(n+1)$, $x_6(n+1)$, and past state quantities (original image pixel information) $x_4(n)$, $x_5(n)$, $x_6(n)$, $x_7(n)$, $x_8(n)$, $x_9(n)$ As a result, a state equation representing the relationship between $x_{p1}(n)$ and $x_{p1}(n+1)$ is composed of $x_{p1}(n)$ from a clear image, $\Phi_{p1}$ comprising 0s and 1s, and drive source vector $\delta_{p1}(n)$ comprising a clear image that is a colored signal, and therefore is configured by means of only desired state quantities (original image pixel information)—that is, clear image information (original image information).

Figures 7A, 7B:
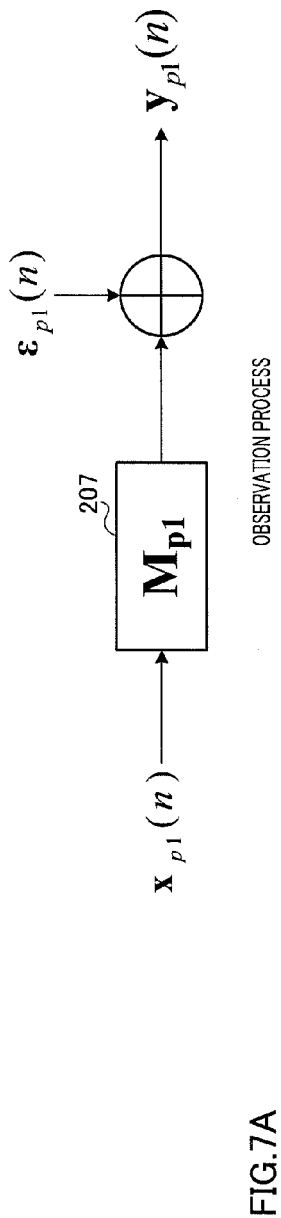
FIG. 7A is a drawing showing an observation process of a state space model.
FIG. 7B is a drawing showing an actual example of an observation equation.

FIG. 7 is a drawing for explaining an actual example of formulation of an observation equation of the invention method, wherein more particularly, FIG. 7A is a drawing showing an observation process of a state space model, and FIG. 7B is a drawing showing an actual example of an observation equation.

Corresponding to the examples in FIG. 5 and FIG. 6, an observation equation in equations 2 is defined by equation 4 below, which is also shown in FIG. 7B. Here, observation vector $y_{p1}(n)$ is a 9×1 vector with nine items of pixel information $y_1(n)$, $y_2(n)$, $y_3(n)$, $y_4(n)$, $y_5(n)$, $y_6(n)$, $y_7(n)$, $y_8(n)$, $y_9(n)$ included in a 3×3 processing-object block as observation quantities including degraded image information as elements. Also, observation transition matrix $M_{p1}$ is a 9×9 matrix defined by equation 4, and corresponds to a blurring point spread function (PSF) in an image degradation model. Elements $h_{r,s}$ (where r, s are h coordinates, and r, s=−1, 0, 1) configuring observation transition matrix $M_{p1}$ are known, and are defined appropriately by conversion to data beforehand. Observed noise vector $\epsilon_{p1}(n)$ is a 9×9 vector having observed noise $\epsilon_1(n)$, $\epsilon_2(n)$, $\epsilon_3(n)$, $\epsilon_4(n)$, $\epsilon_5(n)$, $\epsilon_6(n)$, $\epsilon_7(n)$, $\epsilon_8(n)$, $\epsilon_9(n)$ corresponding to nine pixels included in a 3×3 processing-object block as elements.

(Equation 4)

$$y_{p1}(n) = M_{p1} x_{p1}(n) + \varepsilon_{p1}(n) \quad [4]$$

$$\begin{bmatrix} y_1(n) \\ y_2(n) \\ \vdots \\ y_9(n) \end{bmatrix} = \begin{bmatrix} h_{0,0} & h_{0,-1} & h_{1,1} & h_{1,0} & h_{1,-1} & 0 & 0 & 0 & 0 \\ h_{0,1} & \ddots & \ddots & \ddots & \ddots & \ddots & 0 & 0 & 0 \\ h_{-1,-1} & \ddots & \ddots & \ddots & \ddots & \ddots & \ddots & 0 & 0 \\ h_{-1,0} & \ddots & \ddots & \ddots & \ddots & \ddots & \ddots & \ddots & 0 \\ h_{-1,1} & \ddots & \ddots & \ddots & \ddots & \ddots & \ddots & \ddots & h_{1,-1} \\ 0 & \ddots & \ddots & \ddots & \ddots & \ddots & \ddots & \ddots & h_{1,0} \\ 0 & 0 & \ddots & \ddots & \ddots & \ddots & \ddots & \ddots & h_{1,1} \\ 0 & 0 & 0 & \ddots & \ddots & \ddots & \ddots & \ddots & h_{0,-1} \\ 0 & 0 & 0 & 0 & h_{-1,1} & h_{-1,0} & h_{-1,-1} & h_{0,1} & h_{0,0} \end{bmatrix} \begin{bmatrix} x_1(n) \\ x_2(n) \\ \vdots \\ x_9(n) \end{bmatrix} + \begin{bmatrix} \varepsilon_1(n) \\ \varepsilon_2(n) \\ \vdots \\ \varepsilon_9(n) \end{bmatrix}$$

Figures 8A, 8B:
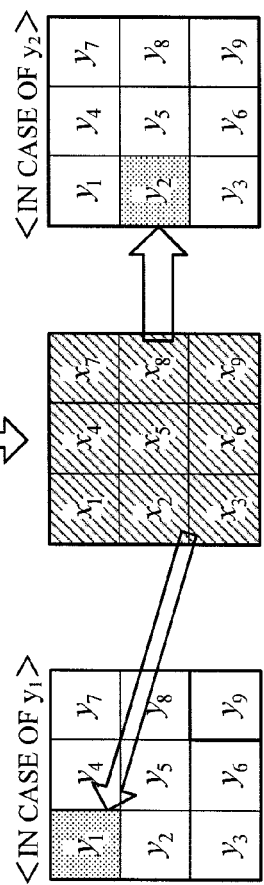
FIG. 8A is a drawing showing a definition of a conventional observation process.
FIG. 8B is a drawing showing visually a range of state quantities that influence an observation quantity.
Figure 9A:
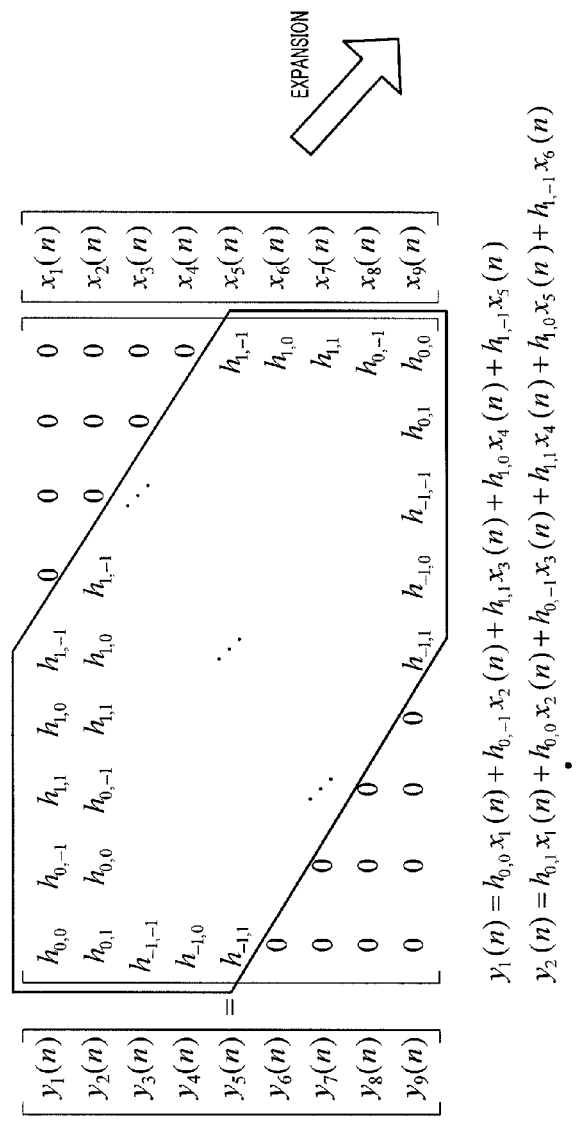
FIG. 9A is a drawing showing a definition of an observation process of an invention method.
Figure 9B:
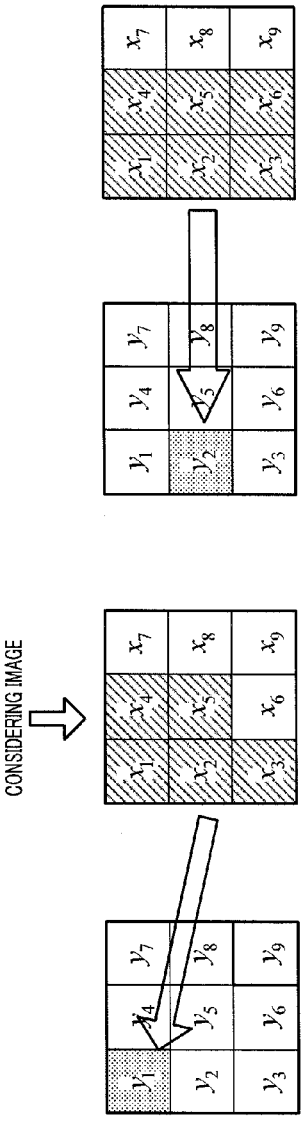
FIG. 9B is a drawing showing visually a range of state quantities that influence an observation quantity.

FIG. 8 is a drawing for explaining a configuration (general example) of a conventional general observation equation, and FIG. 9 is a drawing for explaining a configuration of an observation equation represented by equation 4. More particularly, FIG. 8A is a drawing showing a definition of a conventional observation process and FIG. 8B is a drawing showing visually a range of state quantities that influence an observation quantity, while FIG. 9A is a drawing showing a definition of an observation process of the invention method, and FIG. 9B is a drawing showing visually a range of state quantities that influence an observation quantity. For convenience, observed noise vector $\epsilon_{p1}(n)$ will be omitted in the descriptions of FIG. 8 and FIG. 9.

As explained above, in degradation due to blurring in an image, a certain pixel degrades due to the influence of surrounding pixels. Thus, hitherto, an observation equation has generally been defined as shown in FIG. 8A. In this case, blurring occurs due to the influence of all surrounding pixels. That is to say, each pixel in a processing-object block is influenced by all the pixels in the processing-object block. In other words, each observation quantity $y_i$ (where i=1, 2, ..., 9) is established under the influence of all state quantities $x_i$ (where i=1, 2, ..., 9). This can be represented visually as shown in FIG. 8B, for example. That is to say, as shown in FIG. 8B, both when an observation quantity is $y_1$ and when an observation quantity is $y_2$, for example, the observation quantity is influenced by all 3×3 (=9) state quantities $x_1$ through $x_9$.

Figure 10:
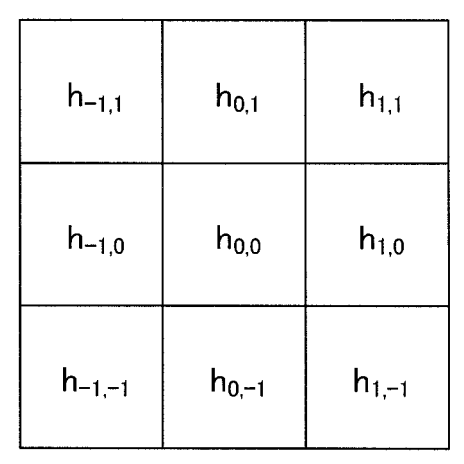

In this regard, a characteristic of an observation equation represented by equation 4 is that some pixels of observation transition matrix $M_{p1}$ are set in a regular manner using 3×3 (=9) factors $h_{r,s}$ (where r, s=−1, 0, 1), and the remaining elements are all set to "0.". For example, FIG. 9A shows some equations ($y_1(n)$ and $y_2(n)$) obtained by expanding an observation equation. The method of assigning factors $h_{r,s}$ to observation transition matrix $M_{p1}$ is as follows. Namely, nine factors $h_{r,s}$ (where r, s=−1, 0, 1) are arranged in the form of a matrix (hereinafter referred to as a "factor matrix") as shown in FIG. 10, and when the position in the center of the factor matrix (that is, factor $h_{0,0}$) is aligned with the position of pixel of interest i of observation quantity $y_i$ (where i=1, 2, ..., 9), factors $h_{r,s}$ (where r, s=−1, 0, 1) are assigned to some pixels of transition matrix $M_{p1}$ in accordance with that factor matrix. This can be represented visually as shown in FIG. 9B, for example. That is to say, as shown in FIG. 9B, for example, when an observation quantity is y1, the observation quantity is influenced by five ($x_1$ through $x_5$) of the 3×3 (=9) state quantities $x_1$ through $x_9$, and when an observation quantity is $y_2$, the observation quantity is influenced by six ($x_1$ through $x_6$) of state quantities $x_1$ through $x_9$.

FIG. 11 is a drawing showing a range of state quantities $x_i$ that influence observation quantities $y_i$, based on observation transition matrix $M_{p1}$ shown in FIG. 9A, together with assigned factors $h_{r,s}$ (where r, s=−1, 0, 1). For convenience of explanation, in FIG. 11A through FIG. 11I, only observation quantity $y_i$ of interest is shown in the left-hand processing-object block, and only $h_{r,s}$ that is multiplied by state quantity $x_i$ is shown in the location of each influenced state quantity $x_i$ in the right-hand processing-object block.

With an observation equation represented by equation 4, observation quantity $y_1$ is influenced by five state quantities $x_1$ through $x_5$ as shown in FIG. 11A, observation quantity $y_2$ is influenced by six state quantities $x_1$ through $x_6$ as shown in FIG. 11B, observation quantity $y_3$ is influenced by seven state quantities $x_1$ through $x_7$ as shown in FIG. 11C, observation quantity $y_4$ is influenced by eight state quantities $x_1$ through $x_8$ as shown in FIG. 11D, observation quantity $y_5$ is influenced by nine state quantities $x_1$ through $x_9$ as shown in FIG. 11E, observation quantity $y_6$ is influenced by eight state quantities $x_2$ through $x_9$ as shown in FIG. 11F, observation quantity $y_7$ is influenced by seven state quantities $x_3$ through $x_9$ as shown in FIG. 11G, observation quantity $y_8$ is influenced by six state quantities $x_4$ through $x_9$ as shown in FIG. 11H, and observation quantity $y_9$ is influenced by five state quantities $x_5$ through $x_9$ as shown in FIG. 11I.

FIG. 12 is a drawing showing an example of an algorithm of the invention method. This algorithm does not depend on the type of image, and can be applied to a moving image as well as a still image.

As shown in FIG. 12, an algorithm of invention method 1 is broadly divided into an initialization process and an iteration process, and the iteration process is configured based on a new state space model (comprising a state equation and observation equation). In the iteration process, procedures 1 through 6 are repeated sequentially.

Figure 13:
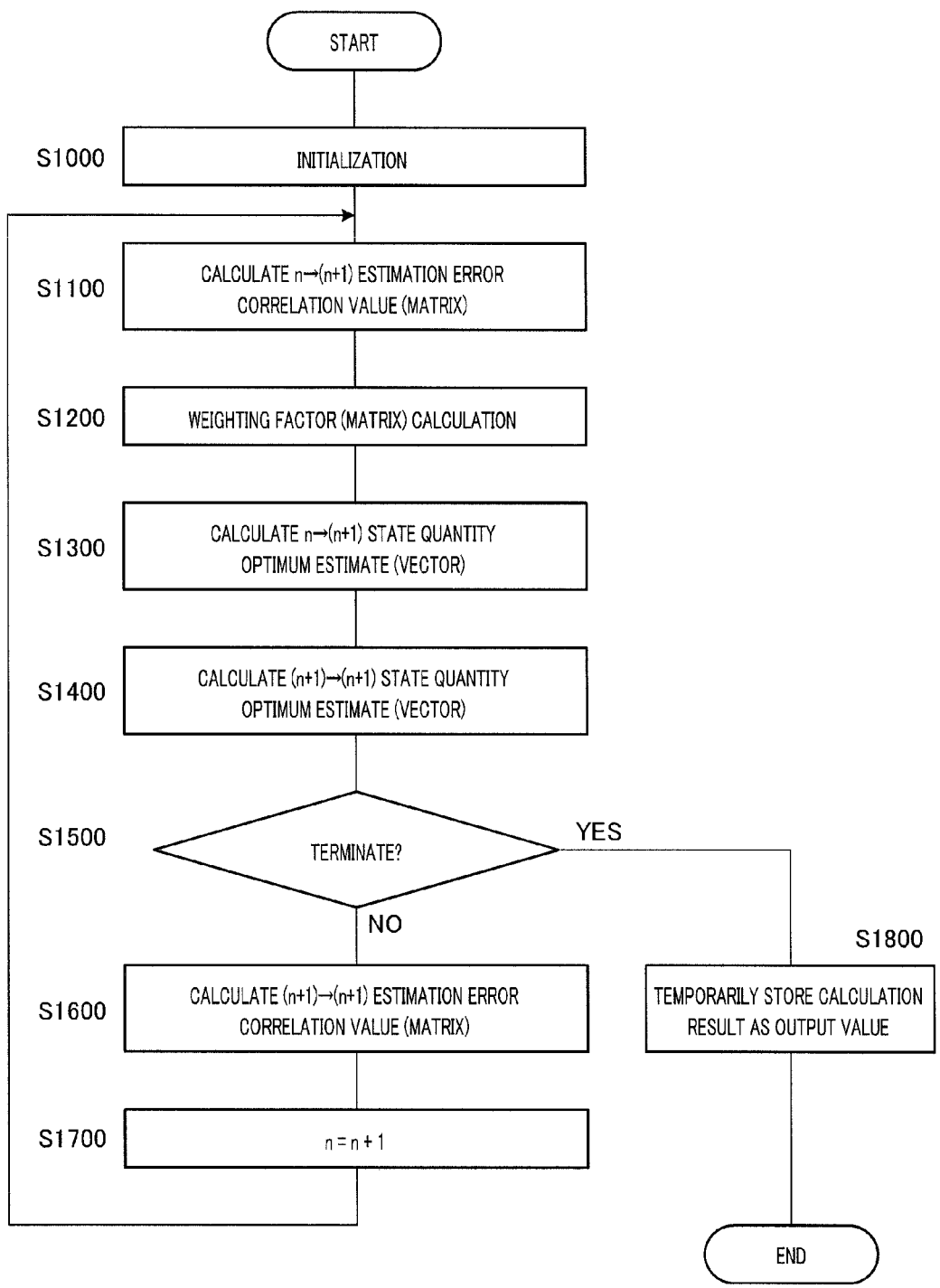
FIG. 13 is a flowchart showing a processing procedure that executes the algorithm in FIG. 12.

FIG. 13 is a flowchart showing a processing procedure that executes the algorithm in FIG. 12.

First, initialization section 162 performs initialization (S1000). Specifically, in initialization section 162, initial value $x_{p1}(0|0)$ of the optimum estimate of a state vector—that is, a state quantity desired signal (original image signal) vector (hereinafter referred to as "desired signal optimum estimate vector"), initial value $P_{p1}(0|0)$ of a correlation matrix of state vector estimation error (hereinafter referred to as "desired signal estimation error vector"), drive source vector covariance $R_{\delta_{p1}}(n)[i,j]$, and observed noise vector covariance $R_{\epsilon_{p1}}(n)[i,j]$, are set as shown in equations 5 below. Also, although not shown in FIG. 12, state transition matrix $\Phi_{p1}$ and observation transition matrix $M_{p1}$ are set as shown in equation 3 and equation 4 respectively. Here, the initial value of a time n counter is set to "0.". When vector and matrix elements are shown, the i'th element of vector a(n) is denoted by a(n)[i], and the row i/column j element of matrix A(n) is denoted by A(n)[i,j]. In FIG. 12, desired signal optimum estimate vector $x_{p1}$ is denoted by $\hat{x}_{p1}$.

(Equations 5)

$$\hat{x}_{p1}(0|0) = 0_K$$
$$P_{p1}(0|0) = I_K$$
$$R_{\delta_{p1}}(n)[i,j] =$$
$$\begin{cases} \frac{1}{K}\sum_{l=1}^{K}[\hat{x}_{p1}^T(n-l)[1]\hat{x}_{p1}(n-l)[1]] & (i=j,\ i,j > K^2 - K) \\ 0 & (i=j,\ i,j \le K^2 - K) \\ 0 & (\text{other}) \end{cases}$$

$$R_{\epsilon_{p1}}[i,j] = E[\epsilon_{p1}(n)\epsilon_{p1}^T(n)][i,j] = \begin{cases} \sigma_\epsilon^2 & i = j \\ 0 & i \ne j \end{cases}$$

[5]

Vector $0_K$ is a K-dimensional zero vector, and matrix $I_K$ is a K-order unitary matrix. When K=3, $K^2-K=6$, and "i,j>$K^2-$K" corresponds to "i,j=7, 8, 9.". $E[\delta_{p1}(n), \delta_{p1}^T(n)]$ is an autocorrelation matrix of drive source vector $\delta_{p1}(n)$. $E[\epsilon_{p1}(n), \epsilon_{p1}^T(n)][i,j]$ is an autocorrelation matrix of observed noise vector $\epsilon_{p1}$, and is here assumed to be equal to $\sigma_\epsilon^2[i,j]$, and to be known. "Known" here means found and given by another arbitrary method (algorithm). If observed noise vector $\epsilon_{p1}(n)$ is white noise and is zero-average, $\sigma_\epsilon^2$ is given by the variance of a predetermined number of samples.

Next, correlation matrix computation section 164 calculates an n→(n+1) estimation error correlation value (matrix) (hereinafter referred to as "correlation matrix") (S1100). Specifically, correlation matrix computation section 164 calculates correlation matrix $P_{p1}(n+1|n)$ of error (a desired signal estimation error vector) when a time n+1 desired signal vector is estimated based on information until time n. This calculation is performed by means of equation 6 below using the values of state transition matrix $\Phi_{p1}$ and drive source vector covariance $R_{\delta_{p1}}(n+1)[i,j]$ set in step S1000, and desired signal estimation error vector correlation matrix $P_{p1}(n|n)$ set in step S1000 (when n=0) or calculated in previous step S1600 (when n>=1). This step S1100 corresponds to procedure 1 of the iteration process in FIG. 12.

$$P_{p1}(n+1|n) = \Phi_{p1}P_{p1}(n|n)\Phi_{p1}^T + R_{\delta_{p1}}(n+1) \quad \text{(Equation 6)}$$

Next, weighting factor matrix calculation section 166 performs weighting factor (matrix) calculation (S1200). Specifically, weighting factor matrix calculation section 166 calculates weighting factor matrix $K_{p1}(n+1)$ such that a result of multiplying estimation error of an observed signal vector that is an observed quantity (hereinafter referred to as "observed signal estimation error vector") by the weighting factor (matrix) and adding optimum estimate vector $x_{p1}(n+1|n)$ of a desired signal at time n+1 based on information until time n is optimum estimate vector $x_{p1}(n+1|n+1)$ of a desired signal at time n+1 based on information until time n+1. This calculation is performed by means of equation 7 below using desired signal estimation error vector correlation matrix $P_{p1}(n+1|n)$ calculated in step S1100, and observation transition matrix $M_{p1}$ and noise vector covariance $R_{\epsilon_{p1}}(n+1)[i,j]$ values set in step S1000. This step S1200 corresponds to procedure 2 of the iteration process in FIG. 12.

[7]

$$K_{p1}(n+1) = \{P_{p1}(n+1|n)M_{p1}^T\}\{M_{p1}P_{p1}(n+1|n)M_{p1}^T + R_{\epsilon_{p1}}(n+1)\}^{-1} \quad \text{(Equation 7)}$$

Next, optimum estimate vector calculation section 168 calculates an n→(n+1) state quantity (desired signal) optimum estimate (vector) (S1300). Specifically, optimum estimate vector calculation section 168 calculates desired signal optimum estimate vector $x_{p1}(n+1|n)$ at time n+1 based on information until time n. This calculation is performed by means of equation 8 below using state transition matrix $\Phi_{p1}$ set in step S1000, and desired signal optimum estimate vector $x_{p1}(n|n)$ calculated in previous step S1400. This step S1300 corresponds to procedure 3 of the iteration process in FIG. 12.

[8]

$$\hat{x}_{p1}(n+1|n) = \Phi_{p1}\hat{x}_{p1}(n|n) \quad \text{(Equation 8)}$$

Next, optimum estimate vector calculation section 168 calculates an (n+1)→(n+1) state quantity (desired signal) optimum estimate (vector) (S1400). Specifically, optimum estimate vector calculation section 168 calculates desired signal optimum estimate vector $x_{p1}(n+1|n+1)$ at time n+1 based on information until time n+1. This calculation is performed by means of equation 9 below using desired signal optimum estimate vector $x_{p1}(n+1|n)$ calculated in step S1300, weighting factor matrix $K_{p1}(n+1)$ calculated in step S1200, observation transition matrix $M_{p1}$ set in step S1000, and observed signal vector $y_{p1}(n+1)$ at time n+1. This step S1400 corresponds to procedure 4 of the iteration process in FIG. 12.

[9]

$$\hat{x}_{p1}(n+1|n+1) = \hat{x}_{p1}(n+1|n) + K_{p1}(n+1)\{y_{p1}(n+1) - M_{p1}\hat{x}_{p1}(n+1|n)\} \quad \text{(Equation 9)}$$

Next, it is determined whether or not processing is to be terminated (S1500). This determination is made, for example, by determining whether or not time n has reached predetermined number of samples N. If the result of this determination is that time n has not reached predetermined number of samples N (S1500: NO), the processing flow proceeds to step S1600, whereas if the result of this determination is that time n has reached predetermined number of samples N (S1500: YES), the processing flow proceeds to step S1800. The criterion for this determination is not limited to the above example. For example, when processing is performed in real time, provision may be made for processing to be terminated when there are no more samples, even if time n has not reached predetermined number of samples N.

In step S1600, correlation matrix computation section 164 calculates an (n+1)→(n+1) error covariance matrix—that is, an (n+1)→(n+1) estimation error correlation value (matrix). Specifically, correlation matrix computation section 164 calculates correlation matrix $P_{p1}(n+1|n+1)$ of error (a desired signal estimation error vector) when a desired signal vector of time n+1 is estimated based on information until time n+1. This calculation is performed by means of equation 10 below using weighting factor matrix $K_{p1}(n+1)$ calculated in step S1200, observation transition matrix $M_{p1}$ set in step S1000, and desired signal estimation error vector correlation matrix $P_{p1}(n+1|n)$ calculated in step S1100. This step S1600 corresponds to procedure 5 of the iteration process in FIG. 12.

[10]

$$P_{p1}(n+1|n+1) = \{I - K_{p1}(n+1)M_{p1}\}P_{p1}(n+1|n) \quad \text{(Equation 10)}$$

Next, in step S1700, the time n counter is incremented by 1 (n=n+1), and the processing flow returns to step S1100.

On the other hand, in step S1800, a calculation result of this algorithm is temporarily stored as an output value. Specifically, desired signal optimum estimate vector $x_{p1}(n+1|n+1)$ calculated in step S1400 is temporarily stored in image restoration processing section 160 as an output value of this algorithm.

FIG. 14 is an explanatory drawing that visually summarizes the invention method. Thus, with invention method 1, a new state space model (comprising a state equation and observation equation) is configured, making possible image restoration processing by means of one-step processing. This is one major characteristic of the present invention.

Characteristics and effects of the invention method will be now described as contrasted with a conventional image restoring method that uses a Kalman filter.

As explained above, with a conventional image restoring method that uses a Kalman filter, image restoration is implemented by means of two-step processing (in which, in step 1, an AR order is decided and an AR coefficient is estimated, and then, in step 2, a state space model (comprising a state equation and observation equation) is configured using this AR coefficient, and Kalman filtering is executed). Therefore, it is only to be expected that image restoration performance by means of a Kalman filter in step 2 is greatly influenced by the precision of the AR order decision and AR coefficient estimation in step 1. In contrast, with the invention method, a new state space model (comprising a state equation and observation equation) is configured that does not require the concept of an AR system, and high-performance image restoration is implemented by means of a new one-step processing prediction method using this. Also, with the invention method, the number of processing steps can be reduced by one, enabling the amount of computation to be reduced, and thus making it possible to achieve a reduction in the circuit scale and memory capacity.

Also, with a conventional image restoring method that uses a Kalman filter, deciding the order of an AR coefficient when performing AR coefficient estimation in step 1 is a major problem. Since the order of an AR coefficient generally depends on a state quantity, it is theoretically difficult to decide the order of an AR coefficient accurately unless the state quantity is known. This means that a state quantity must be known, making real-time processing difficult. Also, since this results in an inaccurate AR coefficient order being used, accurate AR coefficient estimation is difficult. Therefore, this is a major cause of degradation of the image restoration performance of a conventional image restoring method that uses a Kalman filter. Also, even if it were possible to estimate an AR order and AR coefficient accurately in real time by means of some technology or other, an increase in the amount of computation would be unavoidable due to the addition of a processing step. In contrast, with the invention method, the concept of an AR system is not necessary, and therefore this kind of problem does not arise.

Also, with a conventional image restoring method that uses a Kalman filter, modeling is performed by representing a state quantity using an AR system. This means that a conventional image restoring method that uses a Kalman filter can only be applied to a state quantity capable of being modeled by means of an AR system. That is to say, a conventional image restoring method that uses a Kalman filter cannot be applied to a state quantity for which modeling by means of an AR system is difficult. In contrast, with the invention method, the concept of an AR system is not necessary, and therefore there is no such restriction on an application object.

Also, with a conventional image restoring method that uses a Kalman filter, Kalman filter theory is applied on the assumption that a drive source of a state equation is a white signal, and a state quantity and observed noise are uncorrelated. In contrast, with the invention method, an invention method algorithm can be executed by means of a special configuration of a state equation and observation equation even if a drive source is a colored signal (clear image). This means that the invention method can be implemented without considering general Kalman filter theory application conditions. That is to say, the invention method can be said to be more widely applicable than Kalman filter theory.

Therefore, the invention method, which renders the concept of an AR system unnecessary, is a technology that can make a contribution in areas that do not permit image recapturing, such as restoration of an instantaneous image of the heart, lungs, or the like in the medical field, restoration of a soiled or otherwise degraded old document, and character and object recognition.

The present inventors conducted simulations in order to demonstrate the effects of the present invention (the effectiveness of the invention method). Specifically, (1) visual evaluation, (2) objective evaluation, and (3) subjective evaluation were performed in order to evaluate the image restoration capability of invention method 1. Visual evaluation is an evaluation in which an original image and restored image are compared visually, objective evaluation is a numerical evaluation, and subjective evaluation is a poll. These are described in order below.

First, the simulation conditions will be described.

FIG. 15 is a drawing for explaining the simulation conditions.

Figure 16:
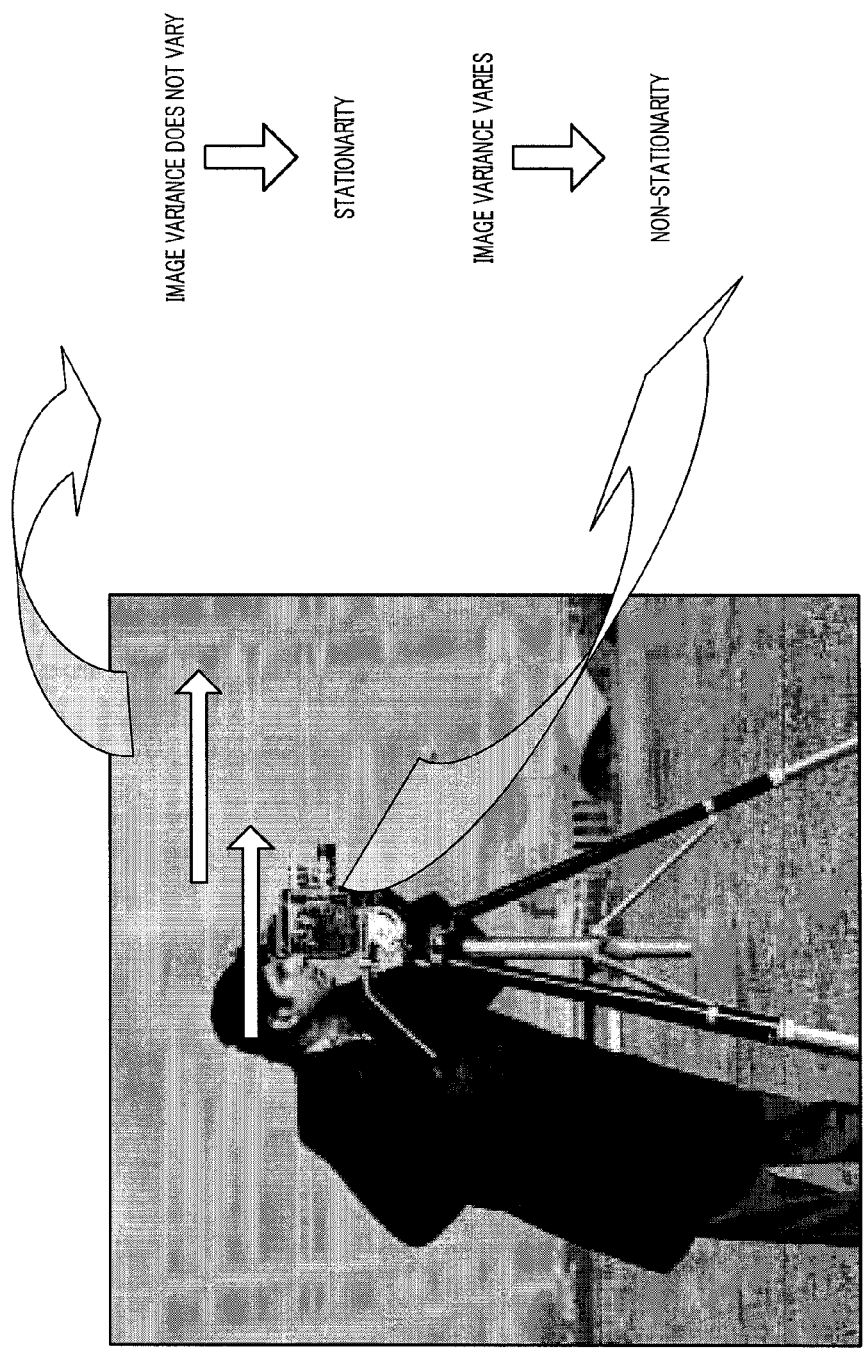
FIG. 16 is a drawing for explaining original image "Cameraman"

In these simulations, the two images shown in FIG. 15—that is, (a) "Cameraman" and (b) "Lenna"—were used. The two-dimensional Gaussian function shown in FIG. 15 was used as a point spread function (PSF) model corresponding to blurring applied to an original image, and additive Gaussian white noise was used as noise. The signal to noise ratio (SNR) was assumed to be 30 dB. For comparison, simulations were performed under identical conditions for conventional method 1 (an image restoring method that uses a Wiener filter), conventional method 2 (an image restoring method that uses a projection filter), conventional method 3 (an image restoring method that uses a Kalman filter), and the invention method (invention method 1). As shown in FIG. 16, the "Cameraman" image, for example, can be said to have high stationarity since image variance does not vary for the part showing the sky, and high non-stationarity since image variance varies for the part showing the man's face.

(1) Visual evaluation. FIG. 17 is a drawing showing simulation results (visual evaluation) for original image "Cameraman", and FIG. 18 is a drawing in which the area circled with a dotted line in FIG. 17 has been enlarged.

As is clearly shown in FIG. 18, with conventional method 1, blurring has scarcely been removed. Also, with conventional method 2, blurring has been removed to a greater extent than with conventional method 1, but blurring still remains as compared with the original image. On the other hand, with conventional method 3, blurring appears to have been removed to give a clear image as compared with conventional methods 1 and 2, but the restored image differs from the original image. More particularly, with conventional method 3, the image is darker overall than the original image, and degradation is greater than in the degraded image in the part showing the sky.

In contrast, with the invention method, it can be confirmed that, as is clearly shown in FIG. 18, the original image has been more faithfully restored than in the case of conventional methods 1, 2, and 3. That is to say, the effectiveness of the invention method can be confirmed even in the enlarged images in FIG. 18.

FIG. 19 is a drawing showing simulation results (visual evaluation) for original image "Cameraman", and FIG. 20 is a drawing in which the area circled with a dotted line in FIG. 19 has been enlarged.

As is clearly shown in FIG. 20, when the part showing the camera tripod is considered, with conventional method 1, blurring has not been removed at all. Also, with conventional method 2, blurring has been removed to a greater extent than with conventional method 1, but not to the extent of restoring the original image. On the other hand, with conventional method 3, blurring appears to have been removed to a greater extent than with conventional methods 1 and 2, but the entire image can be confirmed to have become coarser, and to be far removed from the original image.

In contrast, with the invention method, it can be confirmed that, as is clearly shown in FIG. 20, the original image has been more faithfully restored than in the case of conventional methods 1, 2, and 3. That is to say, the effectiveness of the invention method can be confirmed even in the enlarged images in FIG. 20.

FIG. 21 is a drawing showing simulation results (visual evaluation) for original image "Lenna", and FIG. 22 is a drawing in which the area circled with a dotted line in FIG. 21 has been enlarged.

As is clearly shown in FIG. 22, with conventional method 1, blurring has scarcely been removed, and the restored image is whiter overall than the original image (brightness has been increased). Also, with conventional method 2, blurring has been removed to a greater extent than with conventional method 1, but not to the extent of restoring the original image. On the other hand, with conventional method 3, blurring appears to have been removed to give a clear image as compared with conventional methods 1 and 2, but degradation is greater than in the degraded image, and the image is far removed from the original image. This is particularly noticeable in the part showing skin.

In contrast, with the invention method, it can be confirmed that, as is clearly shown in FIG. 22, the original image has been more faithfully restored than in the case of conventional methods 1, 2, and 3. That is to say, the effectiveness of the invention method can be confirmed even in the enlarged images in FIG. 22.

(2) Objective evaluation (numerical evaluation). FIG. 23 is a drawing showing simulation results (objective evaluation) for the original images.

Here, image restoration capability was evaluated using $SNR_{out}$ [dB] represented by equation 11 below, which is also shown in FIG. 23, in order to evaluate the image restoration capability of conventional methods and the invention method. SNR is a ratio of a signal to noise, and the larger the numeric value of SNR, the smaller is the degree of degradation (blurring, noise, or the like), and the better an image can be said to be.

(Equation 11)

$$SNR_{out} = 20\log_{10} \frac{\sum_{x=1}^{256}\sum_{y=1}^{256}\{f(x,y)\}^2}{\sum_{x=1}^{256}\sum_{y=1}^{256}\{f(x,y)-\hat{f}(x,y)\}^2} \text{ [dB]} \qquad [11]$$

Figure 24:
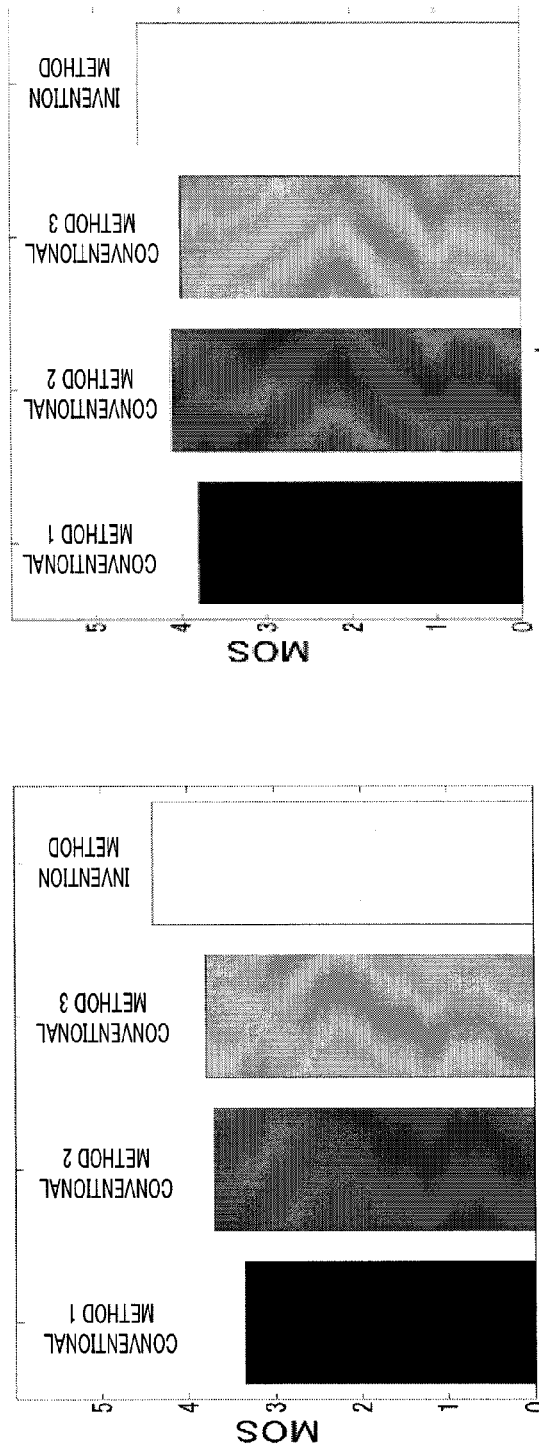
FIG. 24 is a drawing showing simulation results (subjective evaluation) for original images.

In this case, as shown in FIG. 23, it can be confirmed that the numeric value of $SNR_{out}$ is larger for both the "Cameraman" and "Lenna" images in the case of the invention method than in the case of conventional methods 1, 2, and 3. It can be seen from this that the invention method also has higher image restoration capability than conventional methods 1, 2, and 3 from the standpoint of an objective evaluation. FIG. 24 is a drawing showing simulation results (subjective evaluation) for the original images.

Here, subjective evaluation was performed by means of a poll in order to evaluate the image restoration capability of conventional methods and the invention method. Image restoration performance evaluation was performed by means of a poll using a 5-level MOS (Mean Opinion Score) based on ACR (Absolute Category Rating). MOS evaluation standard is as shown in FIG. 24. Fifty pollees evaluated images obtained by image restoration (see FIG. 17 through FIG. 22). Each pollee gave an evaluation value (score) of from 1 to 5 points, 5 points being the highest evaluation.

As shown in FIG. 24, it can be confirmed that in the MOS evaluation a higher evaluation was obtained for both the "Cameraman" and "Lenna" images in the case of the invention method than in the case of conventional methods 1, 2, and 3. It can be seen from this that the invention method also has higher image restoration capability than conventional methods 1, 2, and 3 from the standpoint of a subjective evaluation.

From the above simulation results, it can be seen that an image restoring method of the present invention (invention method 1) demonstrates higher image restoration capability than conventional methods. More particularly, as is clear from the visual evaluations of FIG. 17 through FIG. 22, it can be seen that an image restoring method of the present invention achieves significantly higher restoration precision than conventional methods in edge parts and the like where non-stationarity is high.

Figure 25:
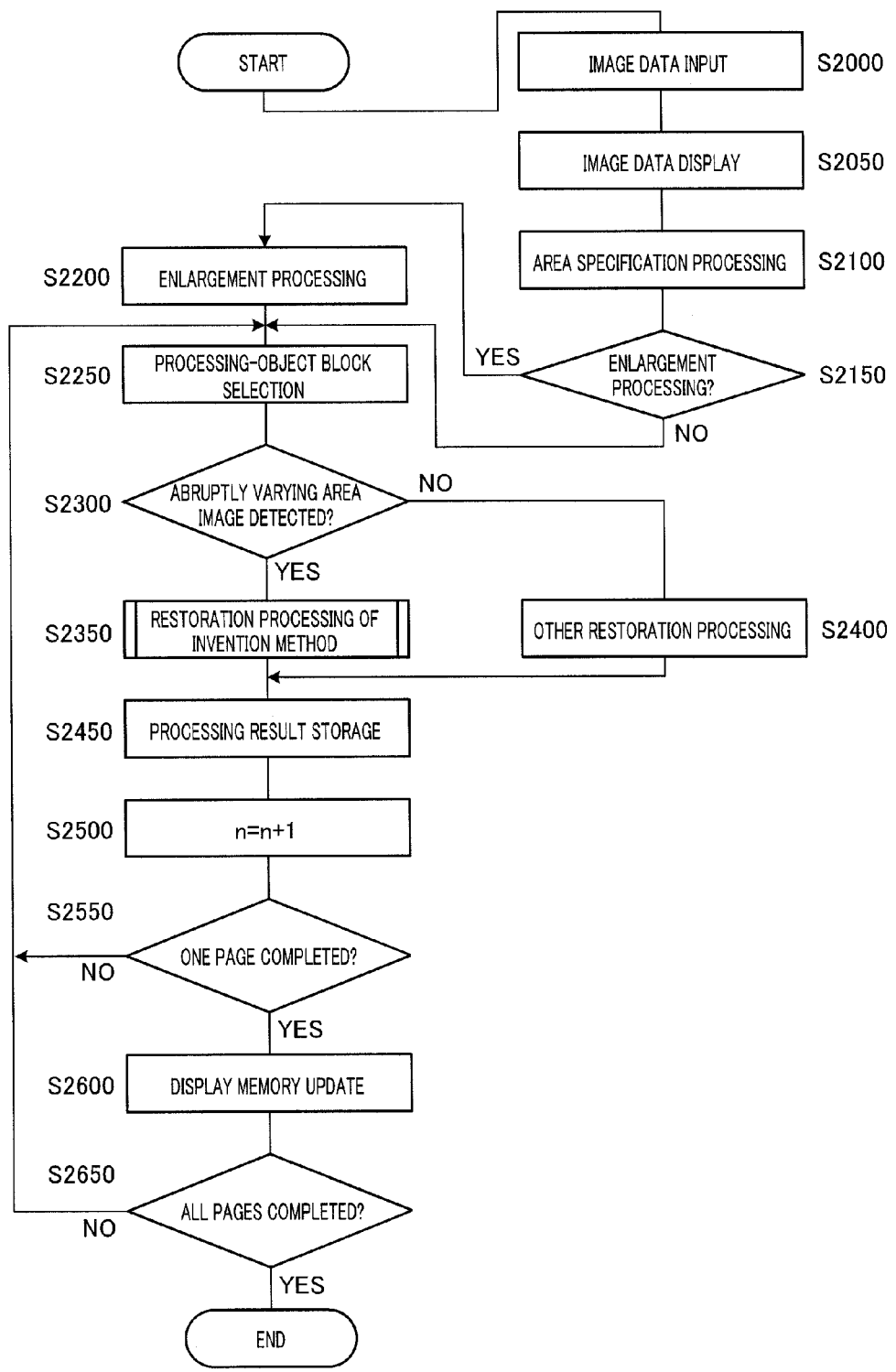
FIG. 25 is a flowchart showing an example of the operation of the image restoring apparatus in FIG. 1.

The operation of image restoring apparatus 100 having the above configuration will now be described using the flowchart shown in FIG. 25. The flowchart shown in FIG. 25 is stored in storage section 150 (main storage apparatus 152 or auxiliary storage apparatus 154) as a computer program, and is executed by a CPU (not shown).

First, in step S2000, image data that is a restoration processing object (a degraded image) is fetched from image input apparatus 110, and is stored in a predetermined storage area of storage section 150 (main storage apparatus 152 or auxiliary storage apparatus 154).

Then, in step S2050, the image data fetched in step S2000 is written to display memory 156 and displayed on display 182.

Then, in step S2100, area specification processing is performed by area specification section 134 of operating section 130. Specifically, when an area (a specific range of an image) that is to be an object of image restoration processing is specified within an image displayed on display 182 in step S2050 by means of a user input operation, data of that specified area is generated. Area specification is performed on the screen by means of a pointer or the like, for example. If area specification is not performed by the user, the entire displayed image is treated as having been specified.

Then, in step S2150, it is determined whether or not enlargement processing is to be performed. This determination can be performed based on the specified area data generated in step S2100. Specifically, if the specified area is smaller than the entire image displayed, it is determined that enlargement processing is to be performed. If enlargement processing is to be performed as a result of this determination (S2150: YES), the processing flow proceeds to step S2200, whereas if enlargement processing is not to be performed (S2150: NO), the processing flow proceeds directly to step S2250.

In step S2200, enlargement processing is performed on the area specified in step S2100. Specifically, for example, enlargement processing is performed so that the specified area becomes of a size corresponding to the entire image displayed. The result of the enlargement processing is written to storage section 150 (main storage apparatus 152 or auxiliary storage apparatus 154) work memory. That image data is written to work memory even if enlargement processing is not performed.

Then, in step S2250, a time n processing-object block (for example, of 3×3 size) is selected.

Figure 26:
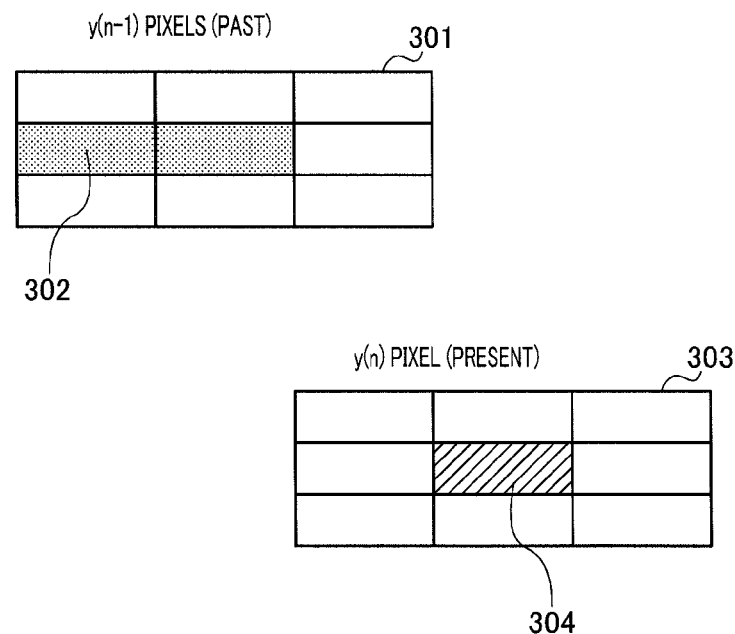
FIG. 26 is a drawing for explaining an example of a detection method of step S2300 in FIG. 25.

Then, in step S2300, it is determined whether or not an abruptly varying area of the image has been detected for the processing-object block selected in step S2250. An abruptly varying area of the image corresponds to an edge part of the image or the like, for example. Specifically, for example, whether or not there is an abrupt pixel data variation point is determined for the image data written to work memory (irrespective of whether or not enlargement processing is performed) by sequentially scanning pixel data in the (3×3-size) processing-object block selected in step S2250. If the result of this determination is that an abruptly varying area of the image has been detected (S2300: YES), the processing flow proceeds to step S2350, whereas if the result is that an abruptly varying area of the image has not been detected (S2300: NO), the processing flow proceeds to step S2400. The absolute value of the difference between average value y'(n−1) of a certain quantity of past observation quantities and current observation quantity y(n)—that is, the value of |y'(n−1)−y(n)|—is compared with threshold value α. Then, if that value is greater than or equal to threshold value α—that is, |y'(n−1)−y(n)|>=α—it is determined that there is an abrupt pixel data variation point, whereas if that value is less than threshold value α—that is, |y'(n−1)−y(n)|<α—it is determined that there is no abrupt pixel data variation point. For example, in FIG. 26, average value y'(n−1) of a certain quantity of observation quantities of predetermined part 302 in processing-object block 301 of time n−1 is compared with observation quantity y(n) of pixel-of-interest part 304 in processing-object block 303 of time n.

In step S2350, image restoration processing according to the invention method is performed on the processing-object block selected in step S2250. As described above, with image restoration processing according to the invention method, high-precision restoration processing is possible even if there is an abrupt pixel data variation point—that is, even if an edge part or the like is included. An example of the detailed procedure of image restoration processing according to the invention method is as described using the flowchart in FIG. 13.

On the other hand, in step S2400, image restoration processing according to an image restoring method other than that of the invention method is performed on the processing-object block selected in step S2250. Any image restoring method, including an image restoring method that uses a Wiener filter, an image restoring method that uses a projection filter, or an image restoring method that uses a Kalman filter, can be used as this other image restoring method. The reason for this is that high-precision restoration processing can also be performed by means of another image restoring method if there is no abrupt pixel data variation point—that is, if an edge part or the like is not included.

Then, in step S2450, step S2350 image restoration processing results or step S2400 image restoration processing results are stored sequentially in storage section 150 (main storage apparatus 152 or auxiliary storage apparatus 154) work memory.

Then, in step S2500, the time n counter value is incremented by 1.

Then, in step S2550, it is determined whether or not one page worth of image restoration processing has ended. This determination is performed based on the time n counter value. If the result of this determination is that one page worth of image restoration processing has ended (S2550: YES), the processing flow proceeds to step S2600, whereas if the result is that one page worth of image restoration processing has not ended (S2550: NO), the processing flow returns to step S2250.

In step S2600, since one page worth of image restoration processing has ended, display memory 156 update processing is performed. That is to say, the configuration here provides for display memory 156 to be updated at a point in time at which one page worth of image restoration processing ends.

Then, in step S2650, it is determined whether or not image restoration processing has ended for all pages of image data fetched in step S2000. If the result of this determination is that image restoration processing has not ended for all pages (S2650: NO), the processing flow returns to step S2250, whereas if the result is that image restoration processing has ended for all pages (S2650: YES), the above series of processing steps is terminated.

An actual example of the setting and implementation of observation transition matrix $M_{p1}$ corresponding to a point spread function (PSF) comprising blurring information will now be described using FIG. 27 and FIG. 28.

Figure 27:
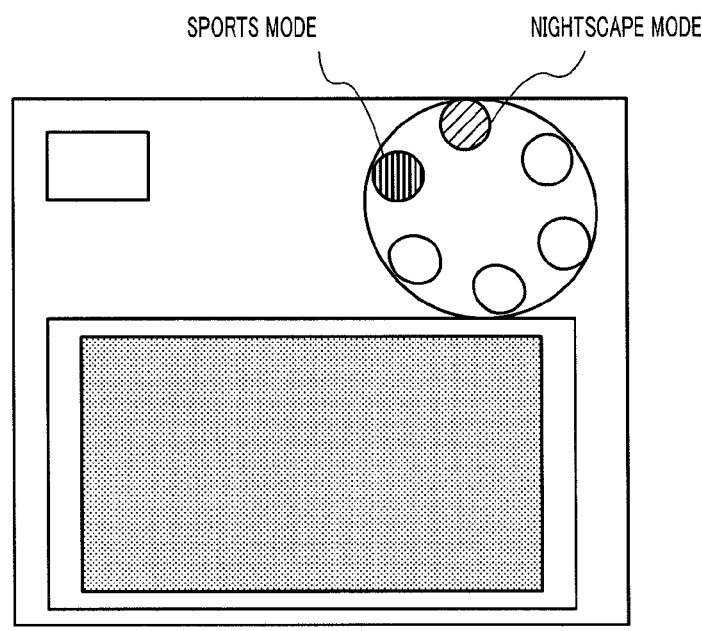
FIG. 27 is a drawing for explaining an example of restoration mode implementation.

FIG. 27 is a drawing for explaining an example of restoration mode implementation.

As explained above, observation transition matrix $M_{p1}$ is a 9×9 matrix that is defined by equation 4 and corresponds to a blurring point spread function (PSF) in an image degradation model, and elements $h_{r,s}$ (where r, s are h coordinates, and r, s=−1, 0, 1) configuring observation transition matrix $M_{p1}$ are known and are defined appropriately by conversion to data beforehand. That is to say, in this embodiment, since the nature of blurring varies according to the image, the configuration provides for a number of sets of values of elements $h_{r,s}$ of observation transition matrix $M_{p1}$ constituting blurring information, so to speak, to be set beforehand as restoration modes, and for a user to specify such a restoration mode arbitrarily via restoration mode specification section 136 of operating section 130. For example, in the example shown in FIG. 27, an appropriate observation transition matrix $M_{p1}$ is set beforehand for each shooting mode, such as a nightscape mode, sports mode, and so forth, often set for digital cameras and the like. Therefore, a user can use an optimum restoration mode by switching the shooting mode. It is also possible for the restoration mode itself (the values of elements $h_{r,s}$ of observation transition matrix $M_{p1}$) to be readjusted automatically or manually.

FIG. 28 is a drawing for explaining another example of restoration mode implementation.

Figure 28A:
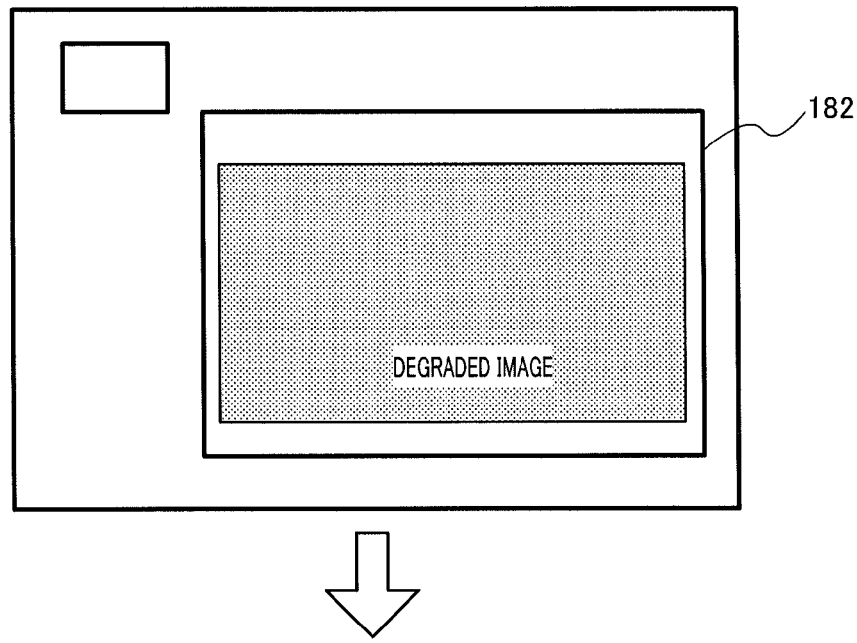
FIG. 28 is a drawing for explaining another example of restoration mode implementation.
Figure 28B:
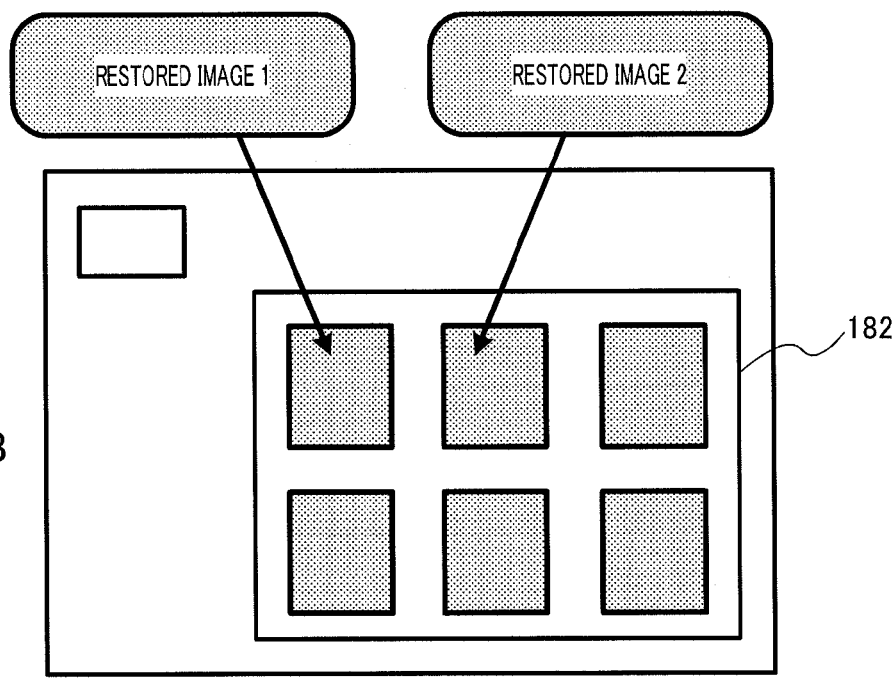

In the example shown in FIG. 28, since the nature of blurring varies according to the image, a processing-object degraded image is first selected on display 182 as shown in FIG. 28(A), and then a number of restored images for which observation transition matrix $M_{p1}$ has been changed (values of elements $h_{r,s}$ have been changed) are displayed on display 182 as shown in FIG. 28(B). At this time, a restored image is decided, for example, when the user selects an optimum restored image from among the plurality of restored images displayed on display 182 via operating section 130 (a touch panel or the like). Storing a user selection history as data makes it possible for a restoration mode (values of elements $h_{r,s}$ of observation transition matrix $M_{p1}$) in line with the user's preferences to be selected automatically.

Thus, according to this embodiment, a new state space model (comprising a state equation and observation equation) is configured that does not require the concept of an AR system, and image restoration is implemented by means of a new one-step processing prediction method, enabling simple and practical high-performance image restoration to be implemented. That is to say, this embodiment uses a simple configuration that does not require an AR order decision and AR coefficient estimation step, has practicality that enables restoration processing to be performed effectively even for a natural image with high non-stationarity, and also enables image restoration capability to be improved compared with conventional methods.

Also, as explained above, since this embodiment does not require the concept of an AR system, it can be widely applied to areas that do not permit image recapturing. Here, too, of course, as stated above, the type of image is not restricted, and may be a still image or a moving image.

For example, by regarding scratching, soiling, and so forth of an old document as noise, removing these using the invention method, and using character and object recognition technology, this embodiment can be expected to demonstrate its effectiveness in the deciphering, restoration, and conversion to a digital database of old documents.

In the field of crime prevention, also, the installation of crime-prevention cameras (surveillance cameras) and the like is becoming increasingly widespread, and in many case criminals are photographed by a crime-prevention camera or the like and the images help in the search for those criminals. However, the quality of such images is generally poor, and it is common for blurring to occur in images of moving objects. Moreover, such images usually show still greater degradation when enlarged. Thus, quicker identification of criminals can be expected by applying the invention method to such degraded images, including enlarged images, to remove blurring and noise from a degraded image and provide a clear image. Applying the invention method to degraded images, including enlarged images, to remove blurring and noise from a degraded image and provide a clear image in this way is not limited to the field of crime prevention, and can also be applied to cases in which determination of the cause of an accident, diagnosis of an equipment failure, or the like, is performed based on an image captured by a surveillance camera or the like.

Also, with the rapid spread of camera-equipped mobile phones, digital cameras, and so forth, in recent years, we have entered an age in which virtually everyone has such a device. However, image restoration technology provided in such products is face recognition, filtering, or suchlike technology for preventing blurring and noise, and does not make provision for situations that do not permit image recapturing. Therefore, applying the invention method to these products will make instantaneous image restoration possible in situations that do not permit image recapturing.

Meanwhile, in the medical field, one of the most effective means of checking a patient's health is diagnostic imaging using an endoscope, X-ray machine, CT scanner, MRI scanner, or the like. For example, in diagnostic imaging of the heart or lungs, a medical diagnosis is performed based on information that includes blurring and noise due to the action of the heart or lungs. Removing blurring and noise by applying the invention method to such diagnostic imaging makes it possible to provide a specialist with a clear image without delay, and can be expected to be of help in the early discovery of an illness.

In addition, with the growing popularity of car navigation systems in recent years, an increasing number of vehicles are being equipped with front and rear cameras. The invention method is also effective in the case of such vehicle front and rear cameras that require image restoration processing in real time.

The disclosure of Japanese Patent Application No. 2008-206316, filed on Aug. 8, 2008, including the specification, drawings and abstract, is incorporated herein by reference in its entirety.

INDUSTRIAL APPLICABILITY

An image restoring apparatus and image restoring method according to the present invention are suitable for use as a simple and practical image restoring apparatus and image restoring method capable of improving image restoration performance.

REFERENCE SIGNS LIST

100 Image restoring apparatus
110 Image input apparatus
112 Camera
114 Scanner
116, 186 Recording medium
118, 188 Modem
120 Input interface section
130 Operating section
132 Parameter setting section
134 Area specification section
136 Restoration mode specification section
140 Internal interface section
150 Storage section
152 Main storage apparatus
154 Auxiliary storage apparatus
156 Display memory
160 Image restoration processing section
160*a* First restoration processing section
160*b* Second restoration processing section
162 Initialization section 164 Correlation computation section
166 Weighting factor calculation section
168 Optimum estimate calculation section
170 Output interface section
180 Image output apparatus
182 Display
184 Printer

The invention claimed is:

1. An image restoring apparatus that estimates original image information from only degraded image information in which unnecessary information is mixed in with the original image information, the image restoring apparatus comprising:
   a correlation computation section that calculates a correlation value of estimation error when a system state quantity at time n+1 that includes the original image information is estimated based on information until time n or time n+1 for degraded image information of only time n;
   a weighting factor calculation section that calculates a weighting factor for specifying a relationship of an optimum estimate of the state quantity at time n+1 based on information until time n+1, an optimum estimate of the state quantity at time n+1 based on information until time n, and estimation error of an observed quantity including the degraded image information, using a correlation value calculated by the correlation computation section, preset blurring information, and observed noise information, for degraded image information of only time n; and
   an optimum estimate calculation section that calculates an optimum estimate of the state quantity at time n+1 based on information until time n or time n+1, using a weighting factor calculated by the weighting factor calculation section, for degraded image information of only time n,
   wherein the degraded image information is configured by means of pixel information of a processing-object block composed of a pixel area of interest and a surrounding pixel area, and the time n represents an order (nth) of processing of the processing-object block.

2. The image restoring apparatus according to claim 1, wherein:
   the correlation calculation section has a first correlation computation section and a second correlation computation section; and
   the optimum estimate calculation section has a first optimum estimate calculation section and a second optimum estimate calculation section:
   the first correlation computation section calculates an estimation error correlation value matrix when a system state quantity at time n+1 that includes the original image information is estimated based on information until time n for degraded image information of only time n;
   the weighting factor calculation section calculates a weighting factor matrix for specifying a relationship of an optimum estimate of the state quantity at time n+1 based on information until time n+1, an optimum estimate of the state quantity at time n+1 based on information until time n, and estimation error of an observed quantity including the degraded image information, using an estimation error correlation value matrix calculated by the first correlation computation section, the blurring information, and the observed noise information, for degraded image information of only time n;
   the first optimum estimate calculation section calculates an optimum estimate vector of the state quantity at time n+1 based on information until time n for degraded image information of only time n;
   the second optimum estimate calculation section calculates an optimum estimate vector of the state quantity at time n+1 based on information until time n+1, using a weighting factor matrix calculated by the weighting factor calculation section and the blurring information, for degraded image information of only time n; and
   the second correlation computation section calculates an estimation error correlation value matrix when the state quantity at time n+1 is estimated based on information until time n+1, using a weighting factor matrix calculated by the weighting factor calculation section and the blurring information, for degraded image information of only time n.

3. The image restoring apparatus according to claim 2, wherein:
   the first correlation computation section performs calculation of the estimation error correlation value matrix using a predetermined state transition matrix, a provided drive source vector covariance element value, and an estimation error correlation value matrix that is provided or that was calculated by the second correlation computation section a previous time;
   the weighting factor calculation section performs calculation of the weighting factor matrix using an estimation error correlation value matrix calculated by the first correlation computation section, a provided observation transition matrix having the blurring information, and a provided observed noise vector covariance element value;
   the first optimum estimate calculation section performs calculation of the state quantity optimum estimate vector using the state transition matrix, and a state quantity optimum estimate vector that is provided or that was calculated by the second optimum estimate calculation section a previous time;
   the second optimum estimate calculation section performs calculation of the state quantity optimum estimate vector using a state quantity optimum estimate vector calculated by the first optimum estimate calculation section, a weighting factor matrix calculated by the weighting factor calculation section, the observation transition matrix, and an observation quantity at only time n+1; and
   the second correlation computation section performs calculation of the estimation error correlation value matrix using a weighting factor matrix calculated by the weighting factor calculation section, the observation transition matrix, and an estimation error correlation value matrix calculated by the first correlation computation section.

4. An image restoring method that estimates original image information from only degraded image information in which unnecessary information is mixed in with the original image information, the image restoring method comprising:
   a correlation computation step of calculating a correlation value of estimation error when a system state quantity at time n+1 that includes the original image information is estimated based on information until time n or time n+1 for degraded image information of only time n;
   a weighting factor calculation step of calculating a weighting factor for specifying a relationship of an optimum estimate of the state quantity at time n+1 based on information until time n+1, an optimum estimate of the state quantity at time n+1 based on information until time n, and estimation error of an observed quantity including the degraded image information, using a correlation value calculated by the correlation computation step, preset blurring information, and observed noise information, for degraded image information of only time n; and an optimum estimate calculation step of calculating an optimum estimate of the state quantity at time n+1 based on information until time n or time n+1, using a weighting factor calculated by the weighting factor calculation step, for degraded image information of only time n, wherein the degraded image information is configured by means of pixel information of a processing-object block composed of a pixel area of interest and a surrounding pixel area, and the time n represents an order (nth) of processing of the processing-object block.

5. The image restoring method according to claim 4, wherein:

the correlation computation step has a first correlation computation step and a second correlation computation step;

the optimum estimate calculation step has a first optimum estimate calculation step and a second optimum estimate calculation step;

the first correlation computation step calculates an estimation error correlation value matrix when a system state quantity at time n+1 that includes the original image information is estimated based on information until time n for degraded image information of only time n;

the weighting factor calculation step calculates a weighting factor matrix for specifying a relationship of an optimum estimate of the state quantity at time n+1 based on information until time n+1, an optimum estimate of the state quantity at time n+1 based on information until time n, and estimation error of an observed quantity including the degraded image information, using an estimation error correlation value matrix calculated by the first correlation computation step, the blurring information, and the observed noise information, for degraded image information of only time n;

the first optimum estimate calculation step calculates an optimum estimate vector of the state quantity at time n+1 based on information until time n for degraded image information of only time n;

the second optimum estimate calculation step calculates an optimum estimate vector of the state quantity at time n+1 based on information until time n+1, using a weighting factor matrix calculated by the weighting factor calculation step and the blurring information, for degraded image information of only time n; and the second correlation computation step calculates an estimation error correlation value matrix when the state quantity at time n+1 is estimated based on information until time n+1, using a weighting factor matrix calculated by the weighting factor calculation section and the blurring information, for degraded image information of only time n.

6. The image restoring method according to claim 5, wherein:

the first correlation computation step performs calculation of the estimation error correlation value matrix using a predetermined state transition matrix, a provided drive source vector covariance element value, and an estimation error correlation value matrix that is provided or that was calculated by the second correlation computation step a previous time;

the weighting factor calculation step performs calculation of the weighting factor matrix using an estimation error correlation value matrix calculated by the first correlation computation step, a provided observation transition matrix having the blurring information, and a provided observed noise vector covariance element value;

the first optimum estimate calculation step performs calculation of the state quantity optimum estimate vector using the state transition matrix, and a state quantity optimum estimate vector that is provided or that was calculated by the second optimum estimate calculation step a previous time;

the second optimum estimate calculation step performs calculation of the state quantity optimum estimate vector using a state quantity optimum estimate vector calculated by the first optimum estimate calculation step, a weighting factor matrix calculated by the weighting factor calculation step, the observation transition matrix, and an observation quantity at only time n+1; and the second correlation computation step performs calculation of the estimation error correlation value matrix using a weighting factor matrix calculated by the weighting factor calculation step, the observation transition matrix, and an estimation error correlation value matrix calculated by the first correlation computation step.

7. An image restoring program for estimating original image information from only degraded image information in which unnecessary information is mixed in with the original image information, the image restoring program stored on a non-transitory storage medium, the image restoring program causing a computer to execute:

a correlation computation step of calculating a correlation value of estimation error when a system state quantity at time n+1 that includes the original image information is estimated based on information until time n or time n+1 for degraded image information of only time n;

a weighting factor calculation step of calculating a weighting factor for specifying a relationship of an optimum estimate of the state quantity at time n+1 based on information until time n+1, an optimum estimate of the state quantity at time n+1 based on information until time n, and estimation error of an observed quantity including the degraded image information, using a correlation value calculated by the correlation computation step, preset blurring information, and observed noise information, for degraded image information of only time n; and an optimum estimate calculation step of calculating an optimum estimate of the state quantity at time n+1 based on information until time n or time n+1, using a weighting factor calculated by the weighting factor calculation step, for degraded image information of only time n, wherein the degraded image information is configured by means of pixel information of a processing-object block composed of a pixel area of interest and a surrounding pixel area, and the time n represents an order (nth) of processing of the processing-object block.

8. The image restoring program according to claim 7, wherein:

the correlation computation step has a first correlation computation step and a second correlation computation step;

the optimum estimate calculation step has a first optimum estimate calculation step and a second optimum estimate calculation step;

the first correlation computation step calculates an estimation error correlation value matrix when a system state quantity at time n+1 that includes the original image information is estimated based on information until time n for degraded image information of only time n;

the weighting factor calculation step calculates a weighting factor matrix for specifying a relationship of an optimum estimate of the state quantity at time n+1 based on information until n+1, an optimum estimate of the state quantity at time n+1 based on information until time n, and estimation error of an observed quantity including the degraded image information, using an estimation error correlation value matrix calculated by the first correlation computation step, the blurring information, and the observed noise information, for degraded image information of only time n;

the first optimum estimate calculation step calculates an optimum estimate vector of the state quantity at time n+1 based on information until time n for degraded image information of only time n;

the second optimum estimate calculation step calculates an optimum estimate vector of the state quantity at time n+1 based on information until time n+1, using a weighting factor matrix calculated by the weighting factor calculation step and the blurring information, for degraded image information of only time n; and the second correlation computation step calculates an estimation error correlation value matrix when the state quantity at time n+1 is estimated based on information until time n+1, using a weighting factor matrix calculated by the weighting factor calculation section and the blurring information, for degraded image information of only time n.

9. The image restoring program according to claim 8, wherein:

the first correlation computation step performs calculation of the estimation error correlation value matrix using a predetermined state transition matrix, a provided drive source vector covariance element value, and an estimation error correlation value matrix that is provided or that was calculated by the second correlation computation step a previous time;

the weighting factor calculation step performs calculation of the weighting factor matrix using an estimation error correlation value matrix calculated by the first correlation computation step, a provided observation transition matrix having the blurring information, and a provided observed noise vector covariance element value;

the first optimum estimate calculation step performs calculation of the state quantity optimum estimate vector using the state transition matrix, and a state quantity optimum estimate vector that is provided or that was calculated by the second optimum estimate calculation step a previous time;

the second optimum estimate calculation step performs calculation of the state quantity optimum estimate vector using a state quantity optimum estimate vector calculated by the first optimum estimate calculation step, a weighting factor matrix calculated by the weighting factor calculation step, the observation transition matrix, and an observation quantity at only time n+1; and the second correlation computation step performs calculation of the estimation error correlation value matrix using a weighting factor matrix calculated by the weighting factor calculation step, the observation transition matrix, and an estimation error correlation value matrix calculated by the first correlation computation step.

10. An image restoring apparatus comprising:
an image input section that inputs image data;
an image restoration processing section that implements the image restoring method according to claim 1, takes image data input by the image input section as degraded image information, and estimates original image information; and
an image output section that outputs original image information estimated by the image restoration processing section.

11. The image restoring apparatus according to claim 10, further comprising an operating section that performs various settings necessary for image restoration processing by the image restoration processing section by means of a user input operation.

12. The image restoring apparatus according to claim 11, wherein:
the operating section further comprises an area specification section that specifies an area that is to be an object of the image restoration processing for the input image data.

13. The image restoring apparatus according to claim 11, wherein:
the image restoration processing section is capable of executing a plurality of restoration modes for which contents of the image restoration processing differ; and
the operating section has a restoration mode specification section that specifies a restoration mode executed by the image restoration processing section.

14. An image restoring method comprising:
an image input step of inputting image data;
an image display step of displaying image data input by the image display step;
an area setting step of setting an area that is to be an object of the image restoration processing for input image data displayed by the image display step;
an image restoration processing step of implementing the image restoring method according to claim 4, taking image data included in an area set by the area setting step from among image data input by the image input step as degraded image information, and estimating original image information; and
an image output step of outputting original image information estimated by the image restoration processing step.

15. The image restoring method according to claim 14, wherein:
the image restoration processing step is capable of executing a plurality of restoration modes for which contents of the image restoration processing differ, and executes image restoration processing whose contents correspond to a specified restoration mode.

16. The image restoring method according to claim 14, further comprising:
another image restoration processing step of implementing an image restoring method other than the image restoring method according to any one of claim 4 through claim 6, taking image data included in an area set by the area setting step from among image data input by the image input step as degraded image information, and estimating original image information; and
a varying area detection step of detecting an abruptly varying area of an image within an area set by the area setting step, wherein the image restoration processing step is executed for an abruptly varying area of an image detected by the varying area detection step, and the other image restoration processing step is executed for another area.

* * * * *